(12) United States Patent
Satern

(10) Patent No.: US 9,472,927 B2
(45) Date of Patent: Oct. 18, 2016

(54) WIRE STRIPPING AND CUTTING TOOL

(71) Applicant: Mark A. Satern, Phoeniz, AZ (US)

(72) Inventor: Mark A. Satern, Phoeniz, AZ (US)

(73) Assignee: Mark A. Satern, Phoenix, AZ (US)

( * ) Notice: Subject to any disclaimer, the term of this patent is extended or adjusted under 35 U.S.C. 154(b) by 8 days.

(21) Appl. No.: 14/691,859

(22) Filed: Apr. 21, 2015

(65) Prior Publication Data

US 2015/0303664 A1    Oct. 22, 2015

Related U.S. Application Data

(60) Provisional application No. 61/982,527, filed on Apr. 22, 2014.

(51) Int. Cl.
*H02G 1/12* (2006.01)

(52) U.S. Cl.
CPC .......... *H02G 1/1204* (2013.01); *H02G 1/1202* (2013.01); *H02G 1/1209* (2013.01); *H02G 1/1214* (2013.01)

(58) Field of Classification Search
CPC .... H02G 1/12; H02G 1/1202; H02G 1/1204; H02G 1/1207; H02G 1/1209; H02G 1/1214; B25F 1/00
USPC ............ 30/90.1, 90.2, 90.6–90.8, 91.1, 91.2; 81/9.4, 9.44; 7/107
See application file for complete search history.

(56) References Cited

U.S. PATENT DOCUMENTS

| | | | | |
|---|---|---|---|---|
| 1,354,365 A * | 9/1920 | Aaron | ................... | H02G 1/1229 30/90.1 |
| 1,800,317 A * | 4/1931 | Ries | ..................... | H02G 1/1229 30/176 |
| 4,625,596 A * | 12/1986 | Makus | ................ | H02G 1/1214 30/90.1 |
| 5,323,502 A * | 6/1994 | Miller | ................. | H02G 1/1214 30/90.6 |
| 5,894,617 A * | 4/1999 | Liou | ........................ | B25B 7/02 7/107 |
| 6,618,885 B1 | 9/2003 | Blaustein | | |
| 6,619,158 B2 | 9/2003 | Bates et al. | | |
| 6,687,991 B2 | 2/2004 | Murg | | |
| 7,356,915 B2 | 4/2008 | Murg | | |
| 7,802,496 B2 | 9/2010 | Pisczak et al. | | |
| 8,074,536 B1 * | 12/2011 | Allen | ..................... | B26B 13/06 30/90.6 |
| 2015/0188272 A1 * | 7/2015 | Esterkin | .............. | H02G 1/1214 7/107 |

* cited by examiner

*Primary Examiner* — Phong Nguyen
(74) *Attorney, Agent, or Firm* — Tarolli, Sundheim, Covell & Tummino LLP

(57) ABSTRACT

A wire stripping and cutting tool comprises two pivotally joined elongated members. First, second, and third pairs of cutting members are mounted on the elongated members. The cutting surfaces of the first pair of cutting members are shaped and dimensioned to cut through the outer sheath of sheathed electrical cable without cutting an electrical conductor within the sheath or the individual conductor insulation covering the conductor. The cutting surfaces of the second pair of cutting members are shaped and dimensioned to cut through the sheath and individual conductor insulation without cutting the conductor. The cutting surfaces of the third pair of cutting members are shaped and dimensioned to cut through the sheath, the individual conductor insulation, and the conductor. If no outer sheath is present, a modified first pair of cutting members may function as guide members to align separate conductors for the second pair of cutting members.

9 Claims, 10 Drawing Sheets

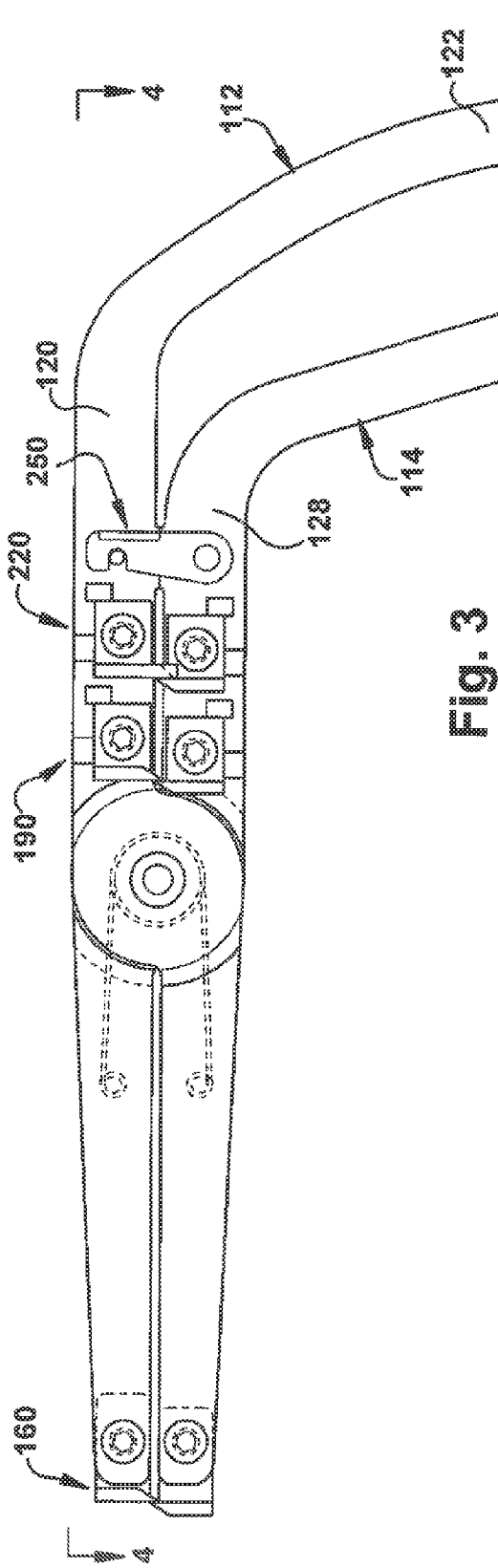
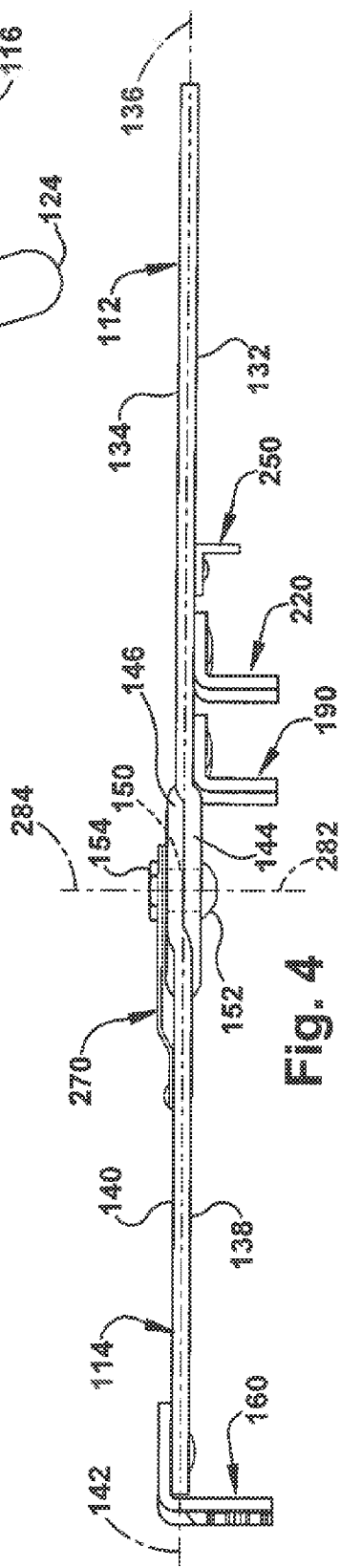
Fig. 3
Fig. 4

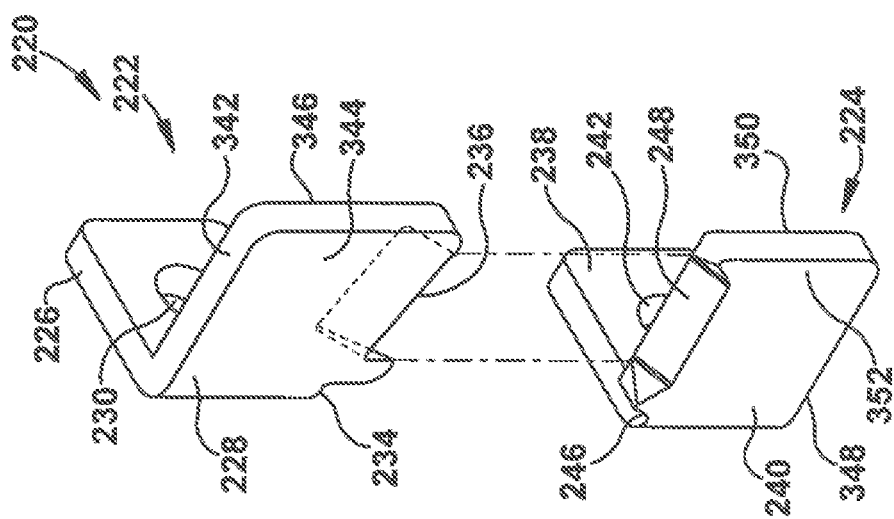
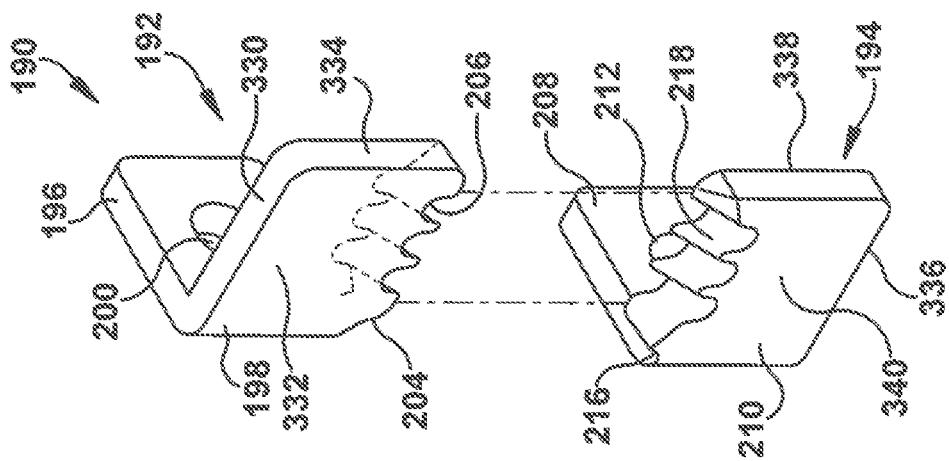
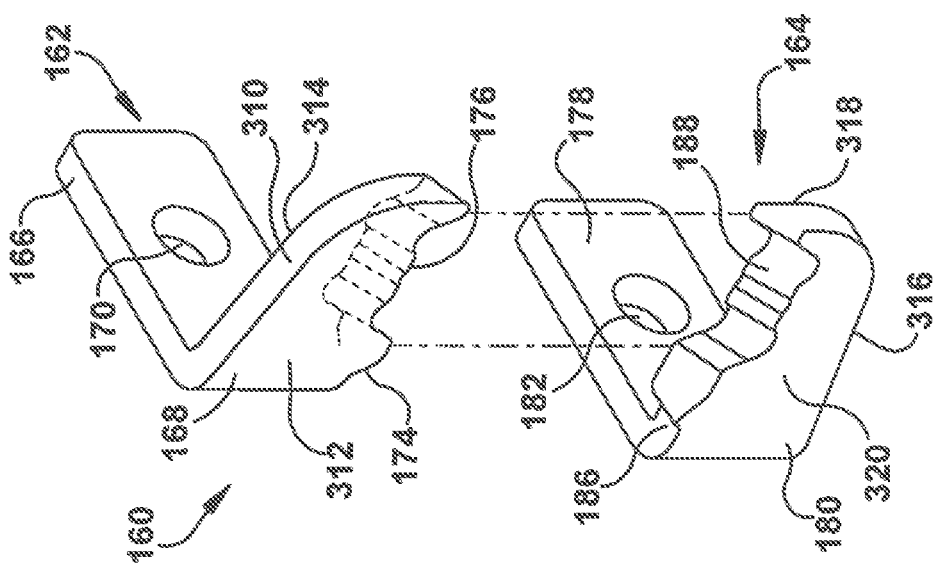

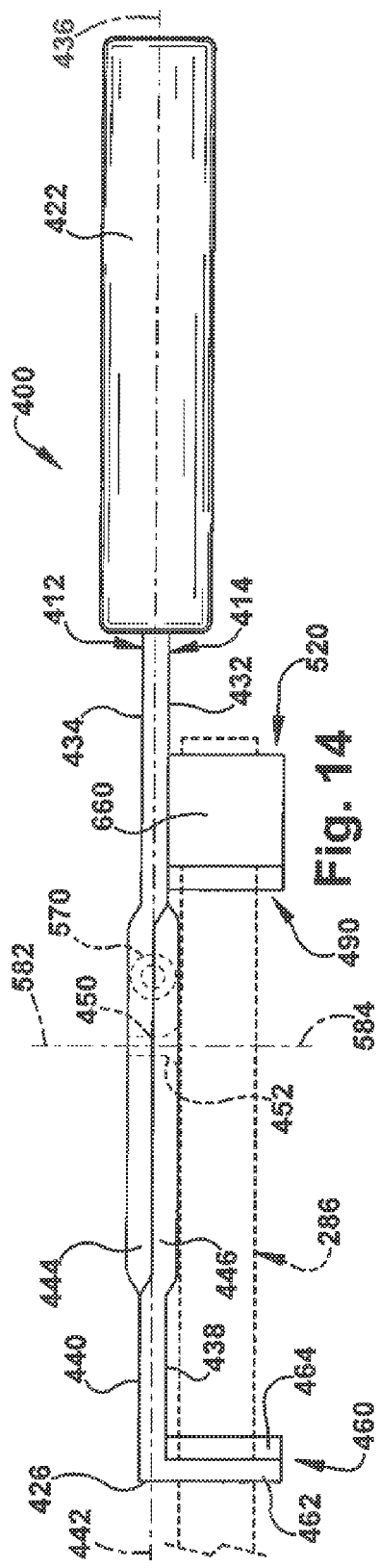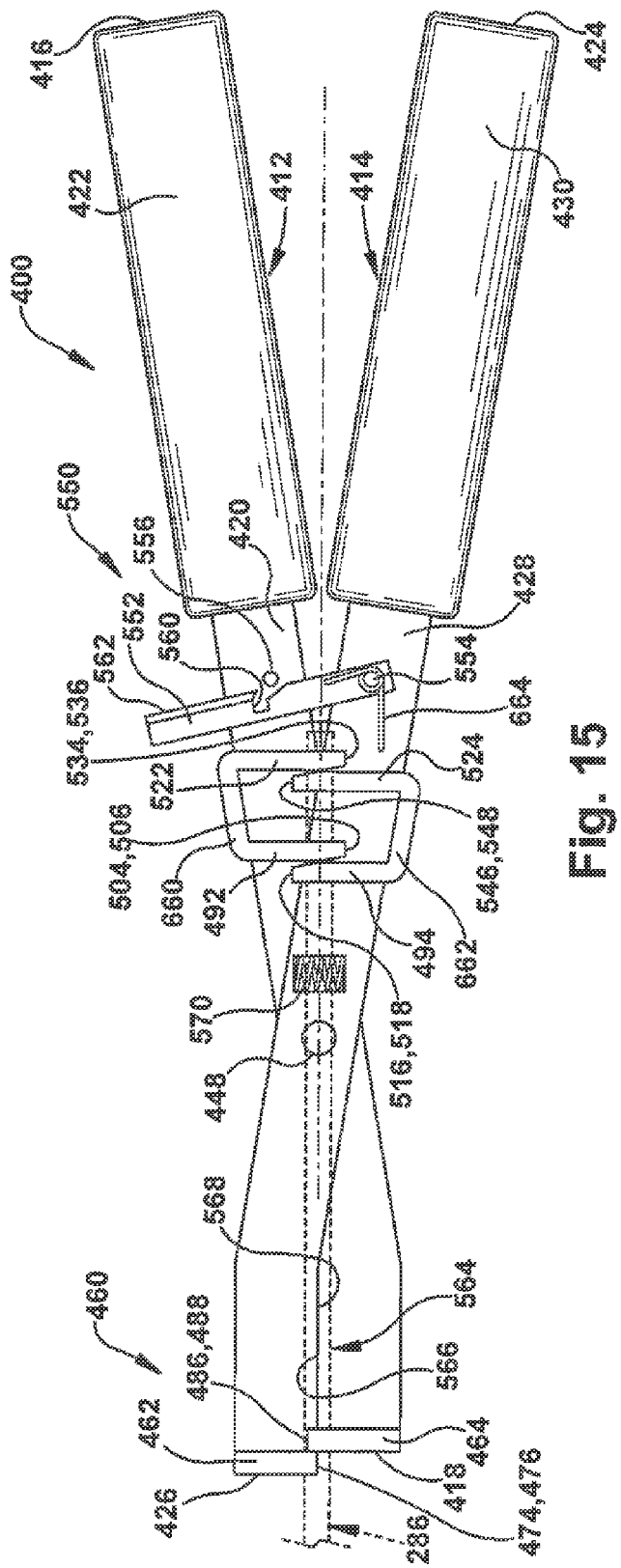

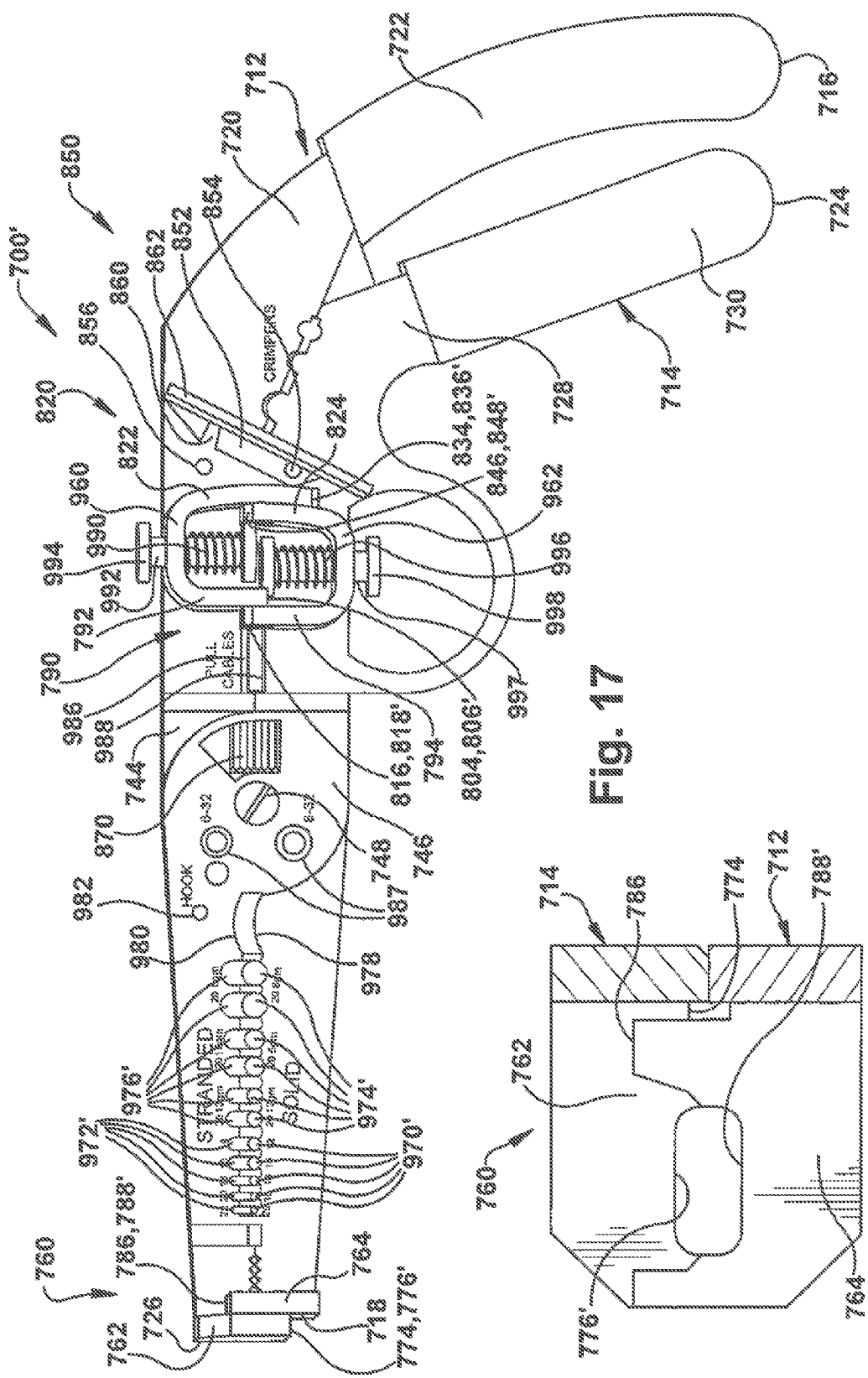

WIRE STRIPPING AND CUTTING TOOL

RELATED APPLICATIONS

This application claims priority from U.S. Provisional Patent Application Ser. No. 61/982,527, filed 22 Apr. 2014. The subject matter of the aforementioned application is hereby incorporated by reference in its entirety.

FIELD OF THE INVENTION

The present invention relates to an electrical conductor stripping and cutting tool that comprises two pairs of cutting members located on opposite sides of a pivot axis and, more particularly, to such a stripping and cutting tool that comprises three pairs of cutting members for use with sheathed electrical conductors.

BACKGROUND OF THE INVENTION

Wiring for residential and light commercial construction in North America typically is a non-metallic sheathed cable. In such sheathed cable, an outer non-metallic sheath, generally formed from an electrically-insulating polyvinyl chloride material, surrounds multiple individual conductors, which are insulated from each other by insulation covering the individual conductors. One type of non-metallic sheathed cable includes two current-carrying conductors with individual insulation and an uninsulated or bare ground wire. For commercial construction other than light commercial construction, the current-carrying conductors and the ground wire all have individual conductor insulation and are typically protected from damage by being installed in a metal conduit or a rigid plastic conduit, rather than having a non-metallic outer sheath Electricians using sheathed cable on a construction site need to be able to cut the outer sheath and strip a length of the outer sheath from the individual conductors without cutting, nicking, or otherwise damaging the individual conductors or the insulation for the individual conductors. In addition, after removing the outer sheath, the electricians need to be able to cut the insulation on the individual conductors and strip a length of insulation from each individual conductor without cutting, nicking, or otherwise damaging the individual conductors. Further, after removing the insulation from the individual conductors, the now-bare conductors and any ground wire need to be cut to an appropriate length for connection to an electrical outlet, junction box, or other electrical device. Similar considerations affect the use of conductors that have individual conductor insulation but that are not surrounded by an outer sheath.

Wire strippers or cutters for individual use (hand tools) are typically constructed to perform one task, such as cutting and stripping the outer sheath, at a time. A hand tool that could perform multiple tasks substantially simultaneously without moving or repositioning a length of sheathed cable or adjacent lengths of separate conductors would save time and effort for electricians.

SUMMARY OF THE INVENTION

The present invention is directed to an electrical conductor stripping and cutting tool that comprises two pairs of cutting members located on opposite sides of a pivot axis and more particularly, to such a stripping and cutting tool that comprises three pairs of cutting members for use with sheathed electrical conductors.

In accordance with an embodiment of the present invention, a tool is provided for stripping and cutting sheathed electrical cable. The cable includes an outer sheath surrounding at least one electrical conductor covered with individual conductor insulation. The tool comprises a first elongated member having a proximal end and a longitudinally opposite distal end and a length extending from the proximal end to the distal end. The tool also comprises a second elongated member having a proximal end and a longitudinally opposite distal end and a length extending from the proximal end of the second elongated member to the distal end of the second elongated member. The second elongated member is joined to the first elongated member such that the first and second elongated members are pivotable about a pivot axis relative to each other. A first pair of cutting members is mounted on the first and second elongated members. One of the first pair of cutting members is mounted on one of the first and second elongated members. The other of the first pair of cutting members is mounted on the other of the first and second elongated members. Each of the first pair of cutting members has a cutting surface oriented transverse to the length of the first elongated member and the length of the second elongated member. Each cutting surface of the first pair of cutting members is presented toward the other cutting surface of the first pair of cutting members. The cutting surfaces of the first pair of cutting members move toward one another upon pivotal movement of the first and second elongated members about the pivot axis relative to each other such that the proximal end of the first elongated member moves toward the proximal end of the second elongated member. A second pair of cutting members is mounted on the first and second elongated members. One of the second pair of cutting members is mounted on one of the first and second elongated members. The other of the second pair of cutting members is mounted on the other of the first and second elongated members. Each of the second pair of cutting members has a cutting surface oriented transverse to the length of the first elongated member and the length of the second elongated member. Each cutting surface of the second pair of cutting members is presented toward the other cutting surface of the second pair of cutting members. The cutting surfaces of the second pair of cutting members move toward one another upon pivotal movement of the first and second elongated members about the pivot axis relative to each other such that the proximal end of the first elongated member moves toward the proximal end of the second elongated member. A third pair of cutting members is mounted on the first and second elongated members. One of the third pair of cutting members is mounted on one of the first and second elongated members. The other of the third pair of cutting members is mounted on the other of the first and second elongated members. Each of the third pair of cutting members has a cutting surface oriented transverse to the length of the first elongated member and the length of the second elongated member. Each cutting surface of the third pair of cutting members is presented toward the other cutting surface of the third pair of cutting members. The cutting surfaces of the third pair of cutting members move toward one another upon pivotal movement of the first and second elongated members about the pivot axis relative to each other such that the proximal end of the first elongated member moves toward the proximal end of the second elongated member. The cutting surfaces of the first pair of cutting members are shaped and dimensioned to cut through the outer sheath of the sheathed electrical cable without cutting the individual conductor insulation covering the at least one electrical conductor and without cutting the at least one electrical conductor when the sheathed electrical cable extends longitudinally from a position between the first pair of cutting members to a position between the third pair of cutting members. The cutting surfaces of the second pair of cutting members are shaped and dimensioned to cut through the outer sheath of the sheathed electrical cable and the individual conductor insulation covering the at least one electrical conductor without cutting the at least one electrical conductor when the sheathed electrical cable extends longitudinally from a position between the first pair of cutting members to a position between the third pair of cutting members. The cutting surfaces of the third pair of cutting members are shaped and dimensioned to cut through (a) the outer sheath of the sheathed electrical cable, (b) the individual conductor insulation covering the at least one electrical conductor, and (c) the at least one electrical conductor when the sheathed electrical cable extends longitudinally from a position between the first pair of cutting members to a position between the third pair of cutting members.

In accordance with another embodiment of the present invention, an electrical conductor stripping and cutting tool comprises a first elongated member having a proximal end and a longitudinally opposite distal end and a length extending from the proximal end to the distal end. The tool also comprises a second elongated member having a proximal end and a longitudinally opposite distal end and a length extending from the proximal end of the second elongated member to the distal end of the second elongated member. The second elongated member is joined to the first elongated member such that the first and second elongated members are pivotable about a pivot axis relative to each other. A first pair of cutting members is mounted on the first and second elongated members. One of the first pair of cutting members is mounted on the first elongated member such that the pivot axis is disposed between said one of the first pair of cutting members and the proximal end of the first elongated member. The other of the first pair of cutting members is mounted on the second elongated member such that the pivot axis is disposed between said other of the first pair of cutting members and the proximal end of the second elongated member. Each of the first pair of cutting members has a cutting surface oriented transverse to the length of the first elongated member and the length of the second elongated member. Each cutting surface of the first pair of cutting members is presented toward the other cutting surface of the first pair of cutting members. The cutting surfaces of the first pair of cutting members move toward one another upon pivotal movement of the first and second elongated members about the pivot axis relative to each other such that the proximal end of the first elongated member and the proximal end of the second elongated member move toward one another. A second pair of cutting members is also mounted on the first and second elongated members. One of the second pair of cutting members is mounted on the first elongated member in a position between the proximal end of the first elongated member and the pivot axis. The other of the second pair of cutting members is mounted on the second elongated member in a position between the proximal end of the second elongated member and the pivot axis. Each of the second pair of cutting members has a cutting surface oriented transverse to the length of the first elongated member and the length of the second elongated member. Each cutting surface of the second pair of cutting members is presented toward the other cutting surface of the second pair of cutting members. The cutting surfaces of the second pair of cutting members moving toward one another upon pivotal movement of the first and second elongated members about the pivot axis relative to each other such that the proximal end of the first elongated member and the proximal end of the second elongated member move toward one another. The cutting surfaces of the first pair of cutting members are shaped and dimensioned to cut through material surrounding an electrical conductor without cutting the conductor when the conductor extends longitudinally from a position between the first pair of cutting members to a position between the second pair of cutting members. The cutting surfaces of the second pair of cutting members are shaped and dimensioned to cut through material surrounding an electrical conductor and also cut through the conductor when the conductor extends longitudinally from a position between the first pair of cutting members to a position between the second pair of cutting members.

In accordance with a further embodiment of the present invention, a tool for stripping and cutting a plurality of electrical conductors covered with individual conductor insulation comprises a first elongated member having a proximal end and a longitudinally opposite distal end. The tool also comprises a second elongated member having a proximal end and a longitudinally opposite distal end and a length extending from the proximal end of the second elongated member to the distal end of the second elongated member. The second elongated member is joined to the first elongated member such that the first and second elongated members are pivotable about a pivot axis relative to each other. A pair of guide members is mounted on the first and second elongated members. One of the pair of guide members is mounted on one of the first and second elongated members. The other of the pair of guide members is mounted on the other of the first and second elongated members. Each of the pair of guide members has a guide surface oriented transverse to the length of the first elongated member and the length of the second elongated member. Each guide surface of the pair of guide members is presented toward the other guide surface of the pair of guide members. The guide surfaces of the pair of guide members move toward one another upon pivotal movement of the first and second elongated members about the pivot axis relative to each other such that the proximal end of the first elongated member and the proximal end of the second elongated member move toward one another. A first pair of cutting members is mounted on the first and second elongated members. One of the first pair of cutting members is mounted on one of the first and second elongated members. The other of the first pair of cutting members is mounted on the other of the first and second elongated members. Each of the first pair of cutting members has a rutting surface oriented transverse to the length of the first elongated member and the length of the second elongated member. Each cutting surface of the first pair of cutting members is presented toward the other cutting surface of the first pair of cutting members. The cutting surfaces of the first pair of cutting members move toward one another upon pivotal movement of the first and second elongated members about the pivot axis relative to each other such that the proximal end of the first elongated member and the proximal end of the second elongated member move toward one another. A second pair of cutting members is also mounted on the first and second elongated members. One of the second pair of cutting members is mounted on one of the first and second elongated members. The other of the second pair of cutting members is mounted on the other of the first and second elongated members. Each of the second pair of cutting members has a cutting surface oriented transverse to the length of the first elongated member and the length of the second elongated member. Each cutting surface of the second pair of cutting members is presented toward the other cutting surface of the second pair of cutting members. The cutting surfaces of the second pair of cutting members move toward one another upon pivotal movement of the first and second elongated members about the pivot axis relative to each other such that the proximal end of the first elongated member and the proximal end of the second elongated member move toward one another. The cutting surfaces of the first pair of cutting members are shaped and dimensioned to cut through the individual conductor insulation covering each of the electrical conductors without cutting the electrical conductors when the electrical conductors extend longitudinally from a position between the pair of guide members to a position between the second pair of cutting members. The cutting surfaces of the second pair of cutting members are shaped and dimensioned to cut through the individual conductor insulation covering each of the electrical conductors and through the plurality of electrical conductors when the electrical conductors extend longitudinally from a position between the pair of guide members to a position between the second pair of cutting members. The guide surfaces of the pair of guide members are shaped and dimensioned to guide the electrical conductors into a predetermined orientation relative to one another as the electrical conductors are extended lengthwise between the guide surfaces. The predetermined orientation is such that the cutting surfaces of the first pair of cutting members will cut through the individual conductor insulation covering each of the electrical conductors without cutting the electrical conductors.

BRIEF DESCRIPTION OF THE DRAWINGS

The foregoing and other features and advantages of the present invention will become apparent to one skilled in the art upon consideration of the following description of the invention and the accompanying drawings, in which:

FIG. 3 is a side view of the wire stripping and cutting tool of FIG. 1 in a closed condition;

FIG. 4 is a top view of the wire stripping and cutting tool of FIG. 3 taken along view line 4-4 of FIG. 3;

FIG. 6 is a perspective view of one set of cutting members of the wire stripping and cutting tool of FIGS. 1 and 2;

FIG. 7 is a perspective view of another set of cutting members of the wire stripping and cutting tool of FIGS. 1 and 2;

FIG. 8 is a perspective view of a further set of cutting members of the wire stripping and cutting tool of FIGS. 1 and 2;

FIG. 14 is a top view of a second embodiment of a wire stripping and cutting tool accordance with the present invention in a closed condition;

FIG. 15 is a side view of the wire stripping and cutting tool of FIG. 14 in a closed condition;

FIG. 17 is a perspective view of a modified version of the wire stripping and cutting tool of FIG. 16 in a closed condition; and FIG. 17A is an enlarged view of a portion of the wire stripping and cutting tool of FIG. 17.

DETAILED DESCRIPTION

Figure 1:
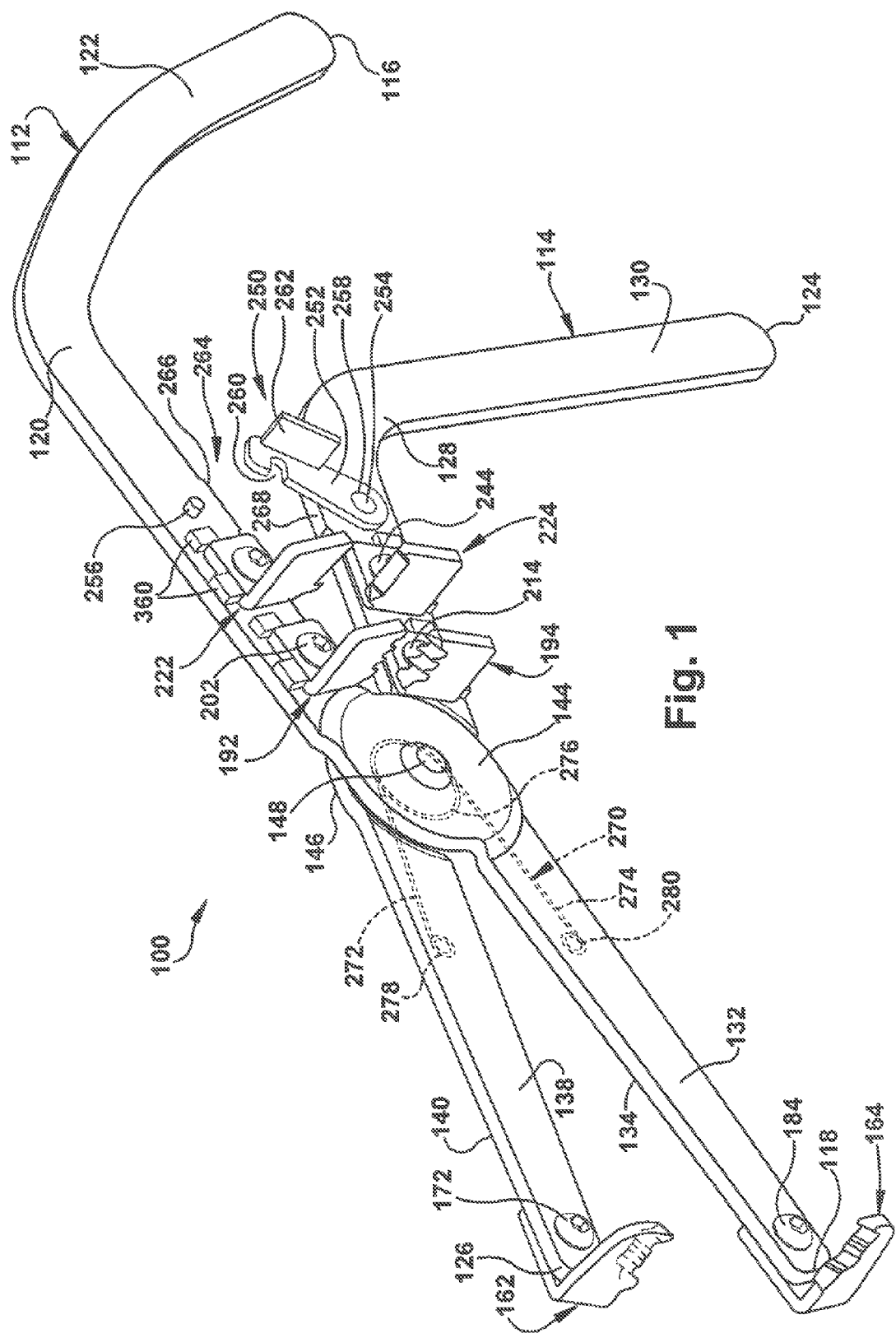
FIG. 1 is a perspective view of a first embodiment of a wire stripping and cutting tool accordance with the present invention in an open condition.

FIGS. 1 through 13 illustrate a wire stripping and cutting tool 100, in accordance with an example of the present invention. The wire stripping and cutting tool 100 includes a first elongated member or first arm 112 and a second elongated member or second arm 114. The first arm 112 has a proximal end 116, which is closer to the user of the wire stripping and cutting tool 100, and an opposite distal end 118, which is farther from the user of the wire cutting and stripping tool. The length or longitudinal extent of the first arm 112 extends from the proximal end 116 to the distal end 118. As shown, a proximal portion 120 of the first arm 112 extends for approximately two-thirds of the length of the first arm from the proximal end 116. Approximately half-way along its length, the proximal portion 120 is bent at about a 75° angle, which provides a handle 122 for the first arm 112 adjacent its proximal end 116. In a similar manner, the second arm 114 has a proximal end 124, which is closer to the user of the wire stripping and cutting tool 100, and an opposite distal end 126, which is farther from the user of the wire cutting and stripping tool. The length or longitudinal extent of the second arm 114 extends from the proximal end 124 to the distal end 126. As shown, a proximal portion 128 of the second arm 114 extends for approximately two-thirds of the length of the second arm from the proximal end 124. Approximately half-way along its length, the proximal portion 128 is bent at about a 75° angle, which provides a handle 130 for the second arm 114 adjacent its proximal end 124.

As best seen in FIGS. 3 and 4, each of the first and second arms 112 and 114 is substantially flat and lies in a plane for a majority of its length. More particularly, the first arm 112 has a first major side surface 132 presented in one direction and a substantially parallel second major side surface 134 presented in an opposite direction. Extending from the proximal end 116 to the distal end 118 of the first arm 112 and generally between the first and second major side surfaces 132 and 134 is a longitudinal axis 136 (FIG. 4). Likewise, the second arm 114 has a first major side surface 138 presented in one direction and a substantially parallel second major side surface 140 presented in an opposite direction. Extending from the proximal end 124 to the distal end 126 of the second arm 114 and generally between the first and second major side surfaces 138 and 140 is a longitudinal axis 142 (FIG. 4). With the foregoing configuration, each of the first and second arms 112 and 114 may be stamped from sheet metal. At a distance of approximately one-third of the length, of the first arm 112 from its distal end 118, a substantially circular, disc-like offset portion 144 is stamped or otherwise formed in the first arm 112. A similar substantially circular, disc-like offset portion 146 is stamped or otherwise formed at approximately the same position along the length of the second arm 114. The offset portions 144 and 146 have complementary shapes so that the first and second arms 112 and 114 can be placed side by side at the offset portions 144 and 146, but otherwise lie in the same plane, as can be seen in FIG. 4. As also can be seen in FIG. 4, the longitudinal axes 136 and 142, which are coaxial when the offset portions 144 and 146 are side by side, do not extend between their corresponding first and second major side surfaces 132, 134 and 138, 140, respectively, in the offset portions.

In the center of each offset portion 144 and 146 is an opening (not shown) that passes through the corresponding first or second arm 112, 114 from the first major side surface 132, 138 to the second major side surface 134, 140. When the first and second arms 112 and 114 are placed side by side at the offset portions 144 and 146, the openings (not shown) are axially aligned. A fastener 148 is received in the aligned openings. The fastener 148 has a shaft 150 (FIG. 4) received in the aligned openings (not shown). At opposite ends of the shaft 150, the fastener 148 has enlargements 152 and 154 that are too large to pass through the aligned openings (not shown) in the offset portions 144 and 146. The enlargements 152 and 154 may be permanently fixed to the shaft 150, as by being formed in one piece with the shaft, or may be removable from the shaft, as by being nuts engaged with a threaded portion of the shaft. The fastener 148 may thus be a rivet, if it is desired to join the first arm 112 to the second arm 114 in a permanent or nonremovable manner, or may a bolt with a removably attached nut, if it is desired to join the first arm to the second arm in a manner that can be undone as may be required for replacement of one of the first and second arms, for example. The shaft 150 of the fastener 148 provides an axle or shaft for pivotal movement of the first and second arms 112 and 114 relative to one another.

Mounted on or attached to the first and second arms 112 and 114 adjacent the distal ends 118 and 126 of the first and second arms is a first pair 160 of cutting members. The first pair 160 of cutting members comprises two cutting members 162 and 164, which are shown individually in FIG. 6. Cutting member 162 is mounted adjacent the distal end 126 of the second arm 114. The cutting member 162 has an overall shape like an "L" with two legs 166 and 168 oriented substantially perpendicular to one another. A hole 170 is formed in the leg 166 and passes entirely through the leg. A surface of the leg 166 that defines the hole 170 is threaded to receive and engage a threaded fastener 172 (FIG. 1). The fastener 172 extends through a hole or passage (not shown) in the second arm 114 and is received in the hole 170 to attach or secure the cutting member 162 to the second major side surface 140 of the second arm 114. The leg 166 has a lower edge 174 with a profiled cutting surface 176, the configuration of which is explained in more detail below. In a similar manner, cutting member 164 is mounted adjacent the distal end 118 of the first arm 112. The cutting member 114 has an overall shape like an "L" with two legs 178 and 180 oriented substantially perpendicular to one another. A hole 182 is formed in the leg 178 and passes entirely through the leg. A surface of the leg 178 that defines the hole 182 is threaded to receive and engage a threaded fastener 184 (FIG. 1) The fastener 184 extends through a hole or passage (not shown) in the first arm 112 and is received in the hole 182 to attach or secure the cutting member 164 to the second major side surface 134 of the first arm 112. The leg 180 has an upper edge 186 with a profiled cutting surface 188, the configuration of which is explained in more detail below.

Figure 2:
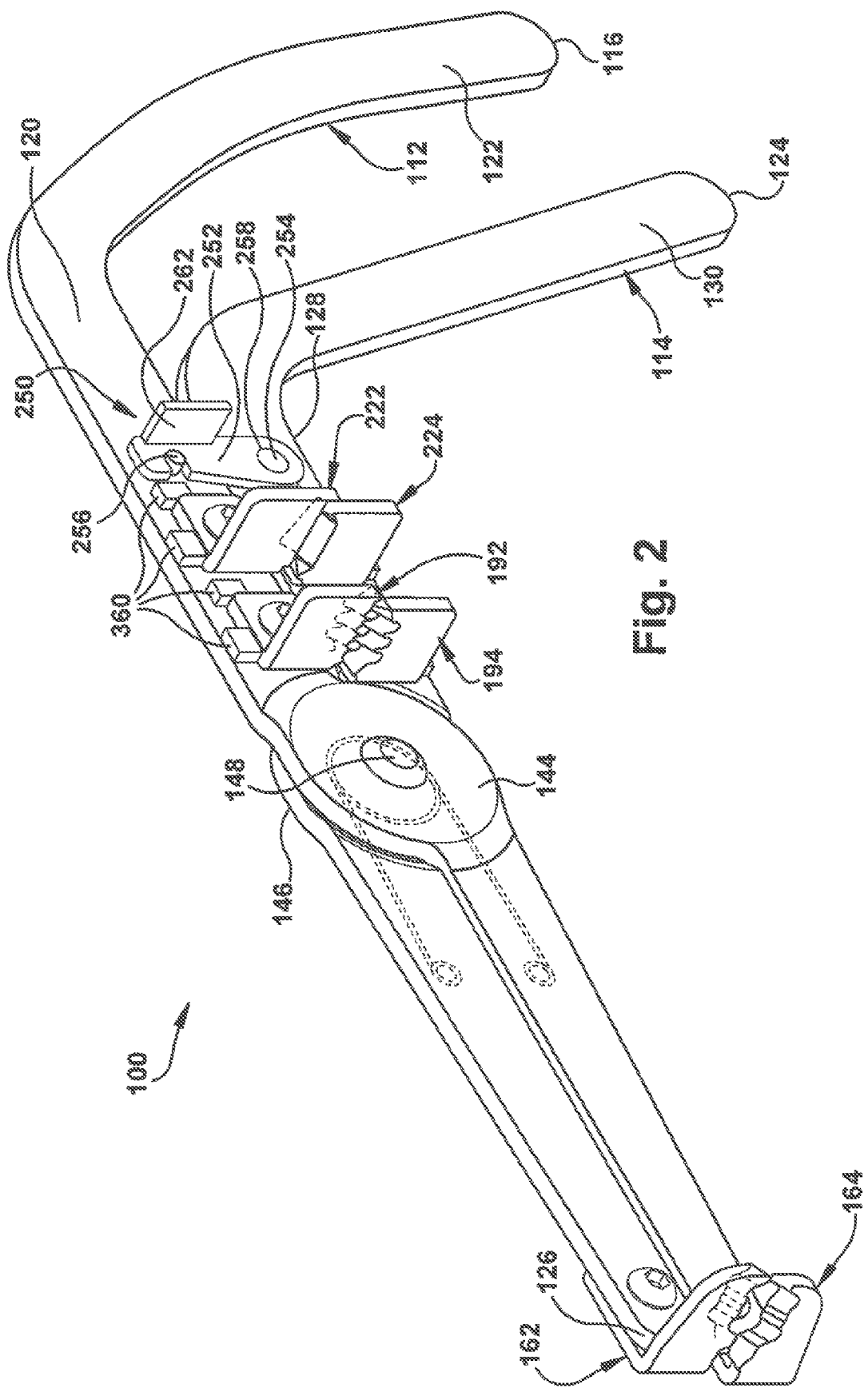
FIG. 2 is a perspective view of the wire stripping and cutting tool of FIG. 1 in a closed condition.
Figure 5:
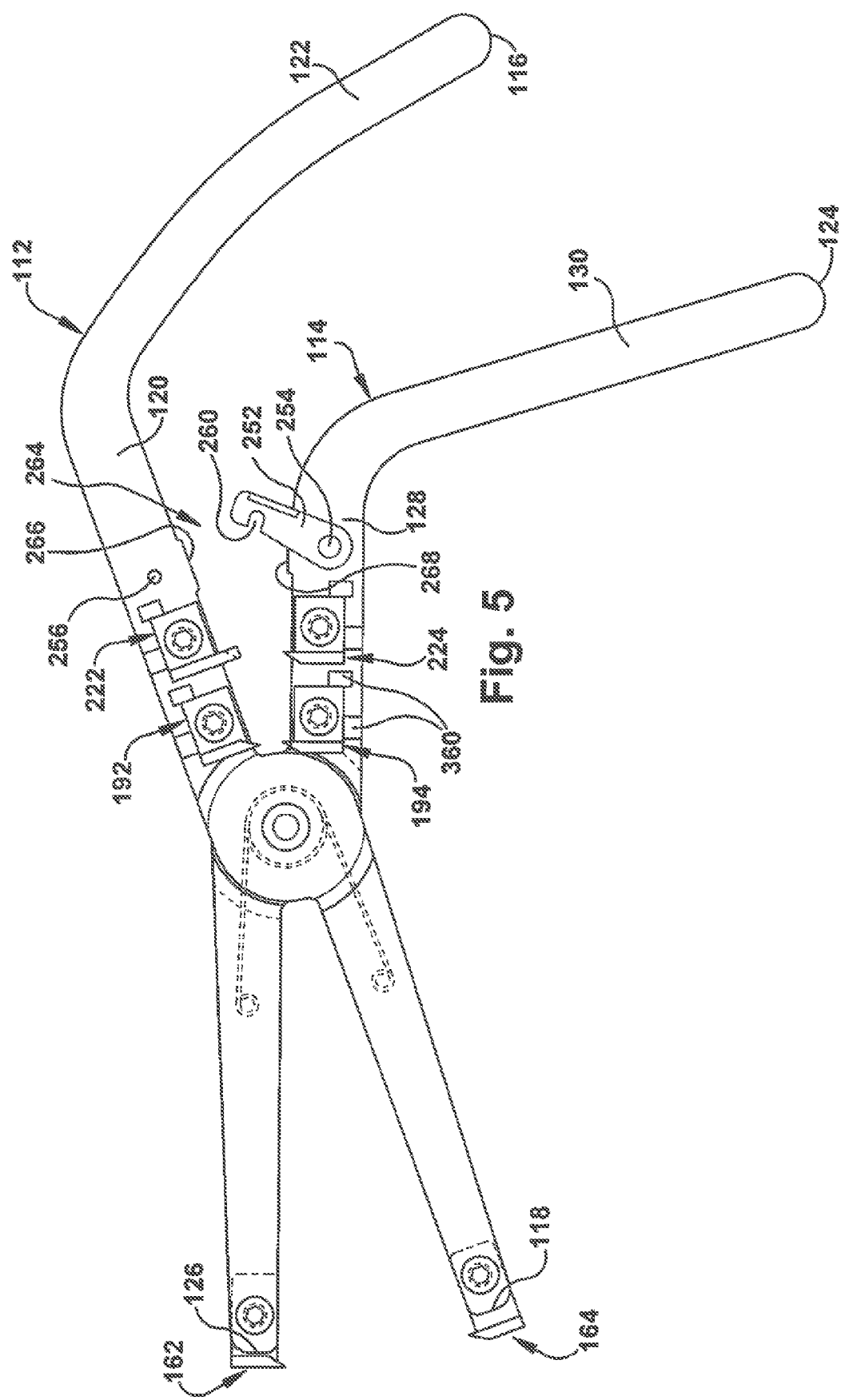
FIG. 5 is a side view of the wire stripping and cutting tool of FIG. 1 in an open condition.

When mounted on or attached to the first and second arms 112 and 114, respectively, the cutting members 164 and 162 of the first pair 160 of cutting members are configured and mounted to work together. Specifically, because the two legs 166 and 168 of the cutting member 162 are oriented substantially perpendicular to one another, when the leg 166 is mounted on or attached to the second arm 114, the leg 168 and the cutting surface 176 will be oriented transverse to or, more particularly, substantially perpendicular to the length and the longitudinal axis 142 of the second arm 114. Similarly, because the two legs 178 and 180 of the cutting member 164 are oriented substantially perpendicular to one another, when the leg 178 is mounted on or attached to the first arm 112, the leg 180 and the cutting surface 188 will be oriented transverse to or, more particularly, substantially perpendicular to, the length and the longitudinal axis 136 of the first arm 112. Both cutting members 162 and 164 project in the same direction, which is a direction toward the viewer in FIGS. 1 and 2. Moreover, as shown in FIG. 1, the cutting members 162 and 164 of the first pair 160 of cutting members are positioned on the second and first arms 114 and 112, respectively, such that the cutting surfaces 176 and 188 are presented toward each other. At the same time, as shown in FIG. 2, the cutting members 162 and 164 are formed and/or positioned such that the cutting surfaces 176 and 188 will pass by one another in close proximity to one another upon relative movement of the first and second arms 112 and 114 in a direction that moves the cutting members toward one another.

Mounted on or attached to the first and second arms 112 and 114 adjacent the offset portions 144 and 146 of the first and second arms and between the offset portions and the corresponding proximal ends 116 and 124 of the first and second arms is a second pair 190 of cutting members. The second pair 190 of cutting members comprises two cutting members 192 and 194, which are shown individually in FIG. 7. Cutting member 192 is mounted adjacent the offset portion 144 of the first arm 112. The cutting member 192 has an overall shape like an "L" with two legs 196 and 198 oriented substantially perpendicular to one another. A hole 200 is formed in the leg 196 and passes entirely through the leg. The hole 200 receives a threaded fastener 202 (FIG. 1) that extends into a threaded hole or passage (not shown) in the first arm 112. The fastener 202 is screwed into the hole or passage (not shown) in the first arm 112 to attach or secure the cutting member 192 to the first major side surface 132 of the first arm. The leg 198 has a lower edge 204 with a profiled cutting surface 206, the configuration of which is explained in more detail below. In a similar manner, cutting member 194 is mounted adjacent the offset portion 146 of the second arm 114. The cutting member 194 has an overall shape like an "L" with two legs 208 and 210 oriented substantially perpendicular to one another. A hole 212 is formed in the leg 208 and passes entirely through the leg. The hole 212 receives a threaded fastener 214 (FIG. 1) that extends into a threaded hole or passage (not shown) in the second arm 114. The fastener 214 is screwed into the hole or passage (not shown) in the second arm 114 to attach or secure the cutting member 194 to the first major side surface 138 of the second arm. The leg 210 has an upper edge 216 with a profiled cutting surface 218, the configuration of which is explained in more detail below.

When mounted on or attached to the first and second arms 112 and 114, respectively, the cutting members 192 and 194 of the second pair 190 of cutting members are configured and mounted to work together. Specifically, because the two legs 196 and 198 of the cutting member 192 are oriented substantially perpendicular to one another, when the leg 196 is mounted on or attached to the first arm 112, the leg 198 and the cutting surface 206 will be oriented transverse to or, more particularly, substantially perpendicular to the length and the longitudinal axis 136 of the first arm 112. Similarly, because the two legs 208 and 210 of the cutting member 194 are oriented substantially perpendicular to one another, when the leg 208 is mounted on or attached to the second arm 114, the leg 210 and the cutting surface 218 will be oriented transverse to or, more particularly, substantially perpendicular to, the length and the longitudinal axis 142 of the second arm 114. Both cutting members 192 and 194 project in the same direction, which is a direction toward the viewer in FIGS. 1 and 2. Moreover, as shown in FIG. 1, the cutting members 192 and 194 of the second pair 190 of cutting members are positioned on the first and second arms 112 and 114, respectively, such that the cutting surfaces 206 and 218 are presented toward each other. At the same time, as shown in FIG. 2, the cutting members 192 and 194 are formed and/or positioned such that the cutting surfaces 206 and 218 will pass by one another in close proximity to one another upon relative movement of the first and second arms 112 and 114 in a direction that moves the cutting members toward one another.

Mounted on or attached to the first and second arms 112 and 114 adjacent the second pair 190 of cutting members and between the second pair of cutting members and the corresponding proximal ends 116 and 124 of the first and second arms is a third pair 220 of cutting members. The third pair 220 of cutting members comprises two cutting members 222 and 224, which are shown individually in FIG. 8. Cutting member 222 is mounted adjacent the cutting member 192 of the second pair 190 of cutting members. The cutting member 222 has an overall shape like an "L" with two legs 226 and 228 oriented substantially perpendicular to one another. A hole 230 is formed in the leg 226 and passes entirely through the leg. The hole 230 receives a threaded fastener 232 (FIG. 1) that extends into a threaded hole or passage (not shown) in the first arm 112. The fastener 232 is screwed into the hole or passage (not shown) in the first arm 112 to attach or secure the cutting member 222 to the first major side surface 132 of the first arm. The leg 226 has a lower edge 234 with a profiled cutting surface 236, the configuration of which is explained in more detail below. In a similar manner, cutting member 224 is mounted adjacent the cutting member 194 of the second pair 190 of cutting members. The cutting member 224 has an overall shape like an "L" with two legs 238 and 240 oriented substantially perpendicular to one another. A hole 242 is formed in the leg 238 and passes entirely through the leg. The hole 242 receives a threaded fastener 244 (FIG. 1) that extends into a threaded hole or passage (not shown) in the second arm 114. The fastener 244 is screwed into the hole or passage (not shown) in the second arm 114 to attach or secure the cutting member 224 to the first major side surface 138 of the second arm. The leg 240 has an upper edge 246 with a profiled cutting surface 248, the configuration of which is explained in more detail below.

When mounted on or attached to the first and second arms 112 and 114, respectively, the cutting members 222 and 224 of the third pair 220 of cutting members are configured and mounted to work together. Specifically, because the two legs 226 and 228 of the cutting member 222 are oriented substantially perpendicular to one another, when the leg 226 is mounted on the first arm 112, the leg 22$ and the cutting surface 236 will be oriented transverse to or, more particularly, substantially perpendicular to, the length and the longitudinal axis 136 of the first arm 112. Similarly, because the two legs 238 and 240 of the cutting member 224 are oriented substantially perpendicular to one another, when the leg 238 is mounted on or attached to the second arm 114, the leg 240 and the cutting surface 248 will be oriented transverse to or, more particularly, substantially perpendicular to, the length and the longitudinal axis 142 of the second arm 114 Both cutting members 222 and 224 project in the same direction, which is a direction toward the viewer in FIGS. 1 and 2. Moreover, as shown in FIG. 1, the cutting members 222 and 224 of the second pair 220 of cutting members are positioned on the first and second arms 112 and 114, respectively, such that the cutting surfaces 236 and 248 are presented toward each other. At the same time, as shown in FIG. 2, the cutting members 222 and 224 are formed and/or positioned such that the cutting surfaces 236 and 248 will pass by one another in close proximity to one another upon relative movement of the first and second arms 112 and 114 in a direction that moves the cutting members toward one another.

Mounted to the first and second arms 112 and 114 adjacent the third pair 220 of cutting members and between the third pair of cutting members and the corresponding proximal ends 116 and 124 of the first and second arms is a trigger mechanism or latch assembly 250 (FIGS. 1 and 2). The latch assembly 250 includes a latch plate 252, a pivot pin 254, and a latch pin 256. The latch plate 252 is an elongated flat member and has a circular opening 258 adjacent one end and a notch 260 adjacent the opposite end of the latch plate 252. The circular opening 258 is dimensioned and configured to receive the pivot pin 254, which is mounted in a permanent and non-removable manner on the second arm 114 so as to project substantially perpendicular to the length and longitudinal axis 142 of the second arm. When the pivot pin 254 is received in the circular opening 258, the latch plate 252 is pivotally mounted on the pivot pin in a permanent and non-removable manner. The notch 260 is dimensioned and configured to receive the latch pin 256, which is mounted in a permanent and non-removable manner to the first arm 112 so as to project substantially perpendicular to the length and longitudinal axis 136 of the first arm. When the latch pin 256 is received in the notch 260, the first and second arms 112 and 114 are spaced apart a small, predetermined distance, as will be explained in greater detail hereafter. To assist in pivoting the latch plate 252 so as to move the latch pin 256 into and out of the notch 260, a thumb plate 262 is attached to or formed in one piece with the latch plate in a manner so as to project substantially perpendicular to the length and longitudinal axis 142 of the second arm 114 in the same direction as the pivot pin 254 and the latch pin 256.

Mounted on or formed on the first and second arms 112 and 114 adjacent the latch assembly 250 is a stop mechanism 264. As shown, the stop mechanism 264 includes a raised edge surface 266 on a lower edge of the first arm 112 and a raised edge surface 268 on an upper edge of the second arm 114. When the proximal portion 120 of the first arm 112 and the proximal portion 128 of the second arm 114 are pivoted toward each other, the raised edge surfaces 266 and 268 will interfere with one another by contacting one another after the proximal portions of the first and second arms have moved so as to be a predetermined distance apart. The contact between the raised edge surfaces 266 and 268 will limit or prevent further movement of the proximal portions 120 and 128 of the first and second arms 112 and 114 toward each other. The contact between the raised edge surfaces 266 and 268 will also limit or prevent further movement of the distal ends 118 and 126 of the first and second arms 112 and 114, respectively, toward each other, as well as movement of the cutting surfaces 176 and 188 of the cutting members 162 and 164, respectively, toward each other, movement of the cutting surfaces 206 and 218 of the cutting members 192 and 194, respectively, toward each other, and movement of the cutting surfaces 236 and 248 of the cutting members 222 and 224, respectively, toward each other. In addition to the stop mechanism 264 or as an alternative to the stop mechanism 264, one or more of the first, second, and third pairs 160, 190, and 220 of cutting members may include a stop mechanism (not shown).

In order to bias the first and second arms 112 and 114 away from each other and thus to bias the cutting surfaces 176 and 188 of the cutting members 162 and 164, respectively, the cutting surfaces 206 and 218 of the cutting members 192 and 194, respectively, and the cutting surfaces 236 and 248 of the cutting members 222 and 224, respectively, away each other to facilitate use of the wire stripping and cutting tool 100 and, particularly, insertion of an electrical cable into the wire stripping and cutting tool, a spring 270 is mounted on or attached to the first and second arms. As shown, the spring 270 is a wire formed with two arms 272 and 274 joined by a coiled portion 276 of the spring. The coiled portion 276 of the spring 270 is mounted side by side with the offset portions 144 and 146 of the first and second arms 112 and 114, encircling the fastener 148. The end 278 of the arm 272 opposite the coiled portion 276 is secured to the second arm 114 between the distal end 126 of the second arm and the offset portion 146 of the second arm. The end 280 of the arm 274 opposite the coiled portion 276 is secured to the first arm 112 between the distal end 118 of the first arm and the offset portion 144 of the first arm.

When the wire stripping and cutting tool 100 is assembled, the fastener 148 is received in the aligned openings (not shown) in the offset portions 144 and 146 of the first and second arms 112 and 114, respectively. The first arm 112 is thus mounted to pivot about a first pivot axis 282 (FIG. 4) that passes through the opening (not shown) in the center of the offset portion 144 of the first arm. The second arm 114 is likewise mounted to pivot about a second pivot axis 284 (FIG. 4) that passes through the opening (not shown) in the center of the offset portion 146 of the second arm. As shown, the first and second pivot axes 282 and 284 are aligned and coaxial and thus are effectively comprise a single pivot axis. The first and second pivot axes 282 and 284 are also aligned with and coaxial with a central longitudinal axis of the fastener and with the length of the fastener 148. The first and second arms 112 and 114 are thus arranged or oriented relative to one another in a scissor-like manner. More particularly, the distal end 126 of the second arm 114 is disposed above, as viewed in FIGS. 1-2, the distal end 118 of the first arm 112. The proximal portion 120 of the first arm 112 is disposed above, as viewed in FIGS. 1-2, the proximal portion 128 of the second arm 114. Movement of the handle 122 of the first arm 112 toward the handle 130 of the second arm 114 will thus cause the distal end 118 of the first arm to move toward the distal end 126 of the second arm. Such movement of the handles 122 and 130 will also cause movement of the cutting surfaces 176 and 188 of the cutting members 162 and 164, respectively, toward each other, movement of the cutting surfaces 206 and 218 of the cutting members 192 and 194, respectively, toward each other, and movement of the cutting surfaces 236 and 248 of the cutting members 222 and 224, respectively, toward each other. Such movement of the handles 122 and 130 will also be movement against the biasing action of the spring 270, which biases the handles 122 and 130 away from each other. Further, because the cutting surfaces 176 and 188, the cutting members 162 and 164, the cutting surfaces 206 and 218, the cutting members 192 and 194, the cutting surfaces 236 and 248, and the cutting members 222 and 224 are all oriented substantially parallel to the lengths and the longitudinal axes 136 and 142 of the first and second arms 112 and 114, respectively, all of those cutting surfaces and cutting members will be oriented substantially parallel to one another.

In use, in the configuration shown, the wire stripping and cutting tool 100 is intended to be employed as a hand tool to strip and cut non-metallic sheathed cable, such as cable sold under the trademark Romex® by Southwire Company, LLC of Carrollton, Ga., USA. As shown in section taken transverse to its longitudinal extent in FIG. 9, such sheathed cable 286 includes an outer non-metallic sheath 288, typically formed from an electrically-insulating polyvinyl chloride material. The outer non-metallic sheath 288 surrounds multiple individual electrical conductors, such as conductors 290 and 292, which are insulated from each other. More particularly, the conductor 290 is surrounded by individual conductor insulation 294, and the conductor 292 is surrounded by individual conductor insulation 296. Also surrounded by the outer sheath 288 is a bare ground wire or conductor 298 without individual conductor insulation, which is disposed between the conductors 190 and 192. Each of the electrical conductors 290, 292, and 298 may be, for example, a single, solid strand of metal, such as copper or aluminum, or a strand fabricated from several metal filaments twisted or braided together. As shown, each of the electrical conductors 290, 292, and 298, when viewed in cross-section perpendicular to its length, is circular and has circular individual conductor insulation. The electrical conductors 290, 292, and 298 are commonly referred to as wires.

An electrician or another individual working non-metallic sheathed cable, such as the sheathed cable 286, needs to be able to cut the outer sheath, 288 and strip a length of the outer sheath away from the conductors 290 and 292 without cutting, nicking, or otherwise damaging the conductors or the individual conductor insulation 294 and 296 for the conductors. In addition, after removing the outer sheath 288, the electrician needs to be able to cut the individual conductor insulation 294 and 296 on the conductors 290 and 292 and strip a length of insulation from each conductor without cutting, nicking, or otherwise damaging the conductors. Further, after removing the individual conductor insulation 294 and 296 from the conductors 290 and 292, the now-bare conductors and the ground wire 298 need to be cut to an appropriate length for connection to an electrical outlet or other electrical device.

Figure 11:
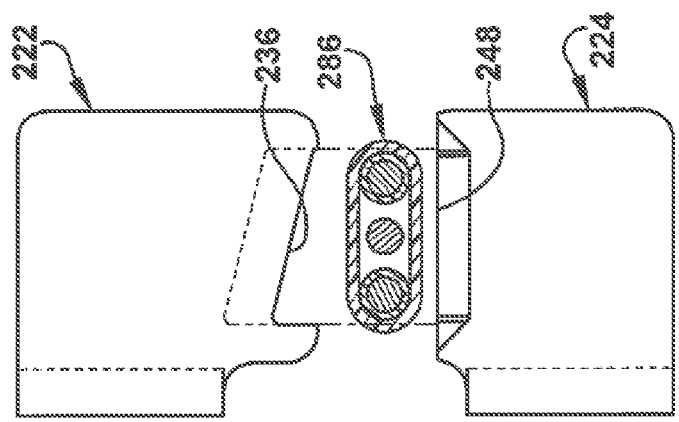
FIG. 11 is an end view of the cutting members of FIG. 8 in an open condition.
Figure 10:
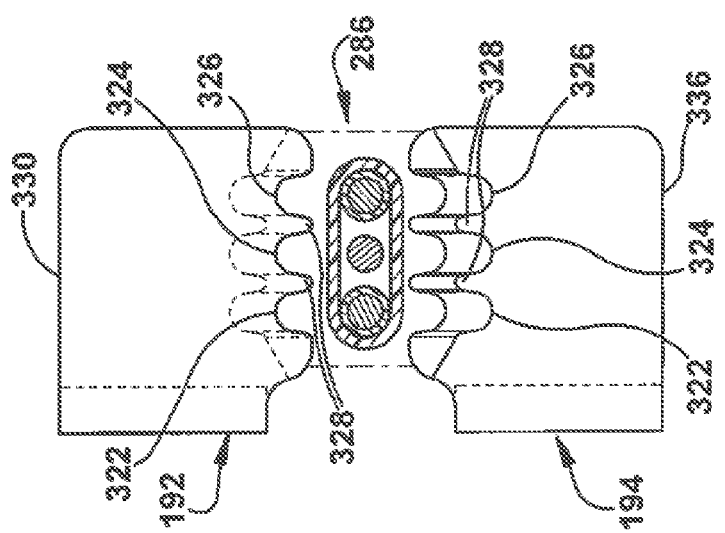
FIG. 10 is an end view of the cutting members of FIG. 7 in an open condition.
Figure 9:
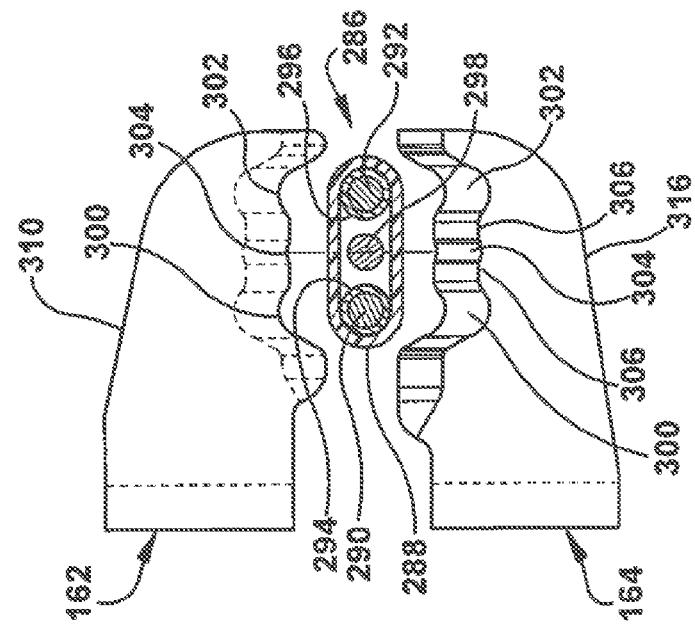
FIG. 9 is an end view of the cutting members of FIG. 6 in an open condition.

The wire stripping and cutting tool 100 provides an electrician or other user with the foregoing functions through single movement of the handles 122 and 130 of the first and second arras 112 and 114, respectively, toward one another, followed by relative longitudinal movement of the wire stripping and cutting tool away from the sheathed cable 286, such as by holding the sheathed cable stationary and pulling the wire stripping and cutting tool proximally or toward the user. The user begins using the wire stripping and cutting tool 100 by allowing the handles 122 and 130 of the first and second arms 112 and 114, respectively, of the wire stripping and cutting tool to spread apart under the bias of the spring 270 and inserting one end of a length of sheathed cable 286 into the wire stripping and cutting tool. More specifically, the length of sheathed cable 286 is inserted between the cutting surfaces 176 and 188 of the cutting members 162 and 164, respectively, between the cutting surfaces 206 and 218 of the cutting members 192 and 194, respectively, and between the cutting surfaces 236 and 248 of the cutting members 222 and 224, respectively, so that the end of the length of sheathed cable is located closer to the user and the proximal ends 116 and 124 of the first and second arms 112 and 114, respectively, and the uncut length of sheathed cable extends beyond the distal ends 118 and 126 of the first and second arms. FIGS. 9, 10 and 11 show the length of sheathed cable 286 in cross-section at the first, second and third pairs of cutting members 160, 190, and 210, respectively.

Figure 12:
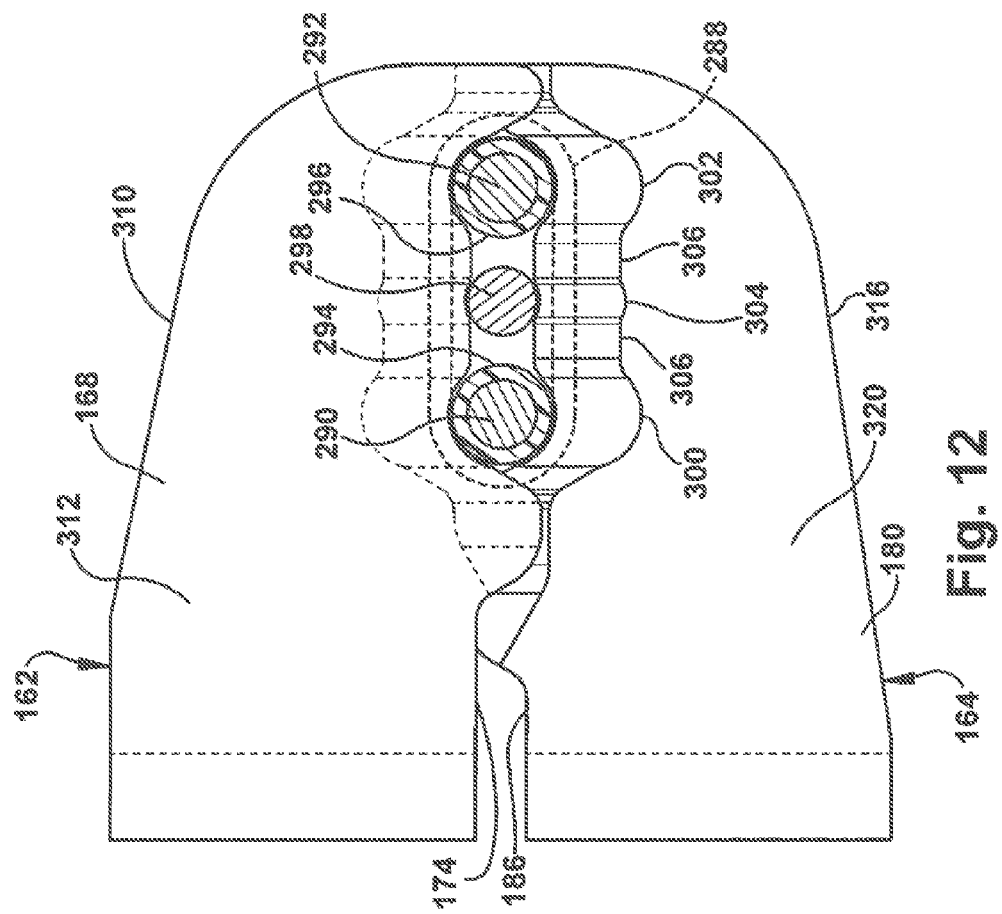
FIG. 12 is an end view of the cutting members of FIG. 6 in a closed condition.

FIG. 9 shows the profile provided or formed on the cutting surfaces 176 and 188 of the cutting members 162 and 164 of the first pair 160 of cutting members in order to cut through the outer sheath 288 of the sheathed cable 286 without cutting, nicking, or otherwise damaging the conductors 290, 292 and 298 or the individual conductor insulation 294 and 296 for the conductors. The profile for each cutting surface 176 and 188 includes two relatively large diameter circular arcs 300 and 302 adjacent opposite ends of the profile. The large diameter circular arcs 300 and 302 are configured and dimensioned to extend around or fit around the individual conductor insulation 294 and 296 for the conductors 290 and 292, respectively, as the cutting surfaces 176 and 188 are moved closer together after cutting through the outer sheath 288, as shown in FIG. 12. Between the spaced apart large diameter circular arcs 300 and 302 on each profile is a single, smaller diameter circular arc 304. The small diameter circular arc 304 is configured and dimensioned to extend around or fit around the bare ground wire or uninsulated conductor 298 as the cutting surfaces 176 and 188 are moved closer together after cutting through the outer sheath 288, as shown in FIG. 12. The small diameter circular arc 304 is connected to each of the large diameter circular arcs 300 and 302 by a relatively short intermediate profile segment 306, which comprises a straight segment with a transition segment at each end of the straight segment to transition into one of the circular arcs 300, 302 or 304.

As can be seen in FIG. 12, the profile of each cutting surface 176 and 188 permits the two cutting surfaces to move toward each other to cut through the outer sheath 288 without also cutting through, nicking or otherwise damaging the individual conductor insulation 294 and 296 or the conductors 290, 292, and 298. To ensure that the foregoing result is achieved, the cutting members 162 and 164 must be mounted on the first and second arms 112 and 114 such that the cutting surfaces 176 and 188 are spaced a predetermined distance apart from one another and the stop mechanism 264 must be positioned at an appropriate predetermined distance from the first and second pivot axes 282 and 284 and the fastener 148 so as to limit the extent to which the cutting members 162 and 164 can move toward one another. It should also be apparent that if the outer sheath 288 of a particular length of sheathed cable 286 had already been removed, the profile of each cutting surface 176 and 188 would tend to guide the conductors 290, 292, and 298 into positions in which the conductors would not be cut or otherwise damaged by the cutting surfaces. Further, the sharpness of the cutting surfaces 176 and 188 may be determined during manufacture of the cutting members 162 and 164 by considering the toughness or resistance to cutting of the outer sheath 288 and the minimum force or load that will be required to be applied by the user to the handles 122 and 130 to enable the cutting surfaces to cut through the outer sheath. The sharpness of the cutting surfaces 176 and 188 will affect the tendency of the cutting surfaces to cut, nick, or otherwise damage the individual conductor insulation 294 and 296 and the conductors 290, 292, and 298.

FIGS. 3, 6, 9 and 12 also show that the cutting surfaces 176 and 188 are beveled or sloped. More particularly, the distance to the cutting surface 176 from an upper edge 310 of the leg 168 of the cutting member 162 is greatest at a side 312 of the leg 168 positioned closest to the cutting member 164. The distance to the cutting surface 176 from the upper edge 310 is smallest at an opposite side 314 of the leg 168. Similarly, the distance to the cutting surface 188 from a lower edge 316 of the leg 180 of the cutting member 164 is greatest at a side 318 of the leg 180 positioned closest to the cutting member 162 and the side 312 of the leg 168 of the cutting member 162. The distance to the cutting surface 188 from the lower edge 316 is smallest at an opposite side 320 of the leg 180. As the distal ends 118 and 126 of the first and second arms 112 and 114 are moved toward each other, the side 312 of the leg 168 of the cutting member 162 will pass in close proximity to the side 318 of the leg 180 of the cutting member 164, and the two sides 312 and 318 will be touching or nearly touching when the distal ends 118 and 126 reach the end of their movement toward one another as determined by the stop mechanism 264.

Figure 13:
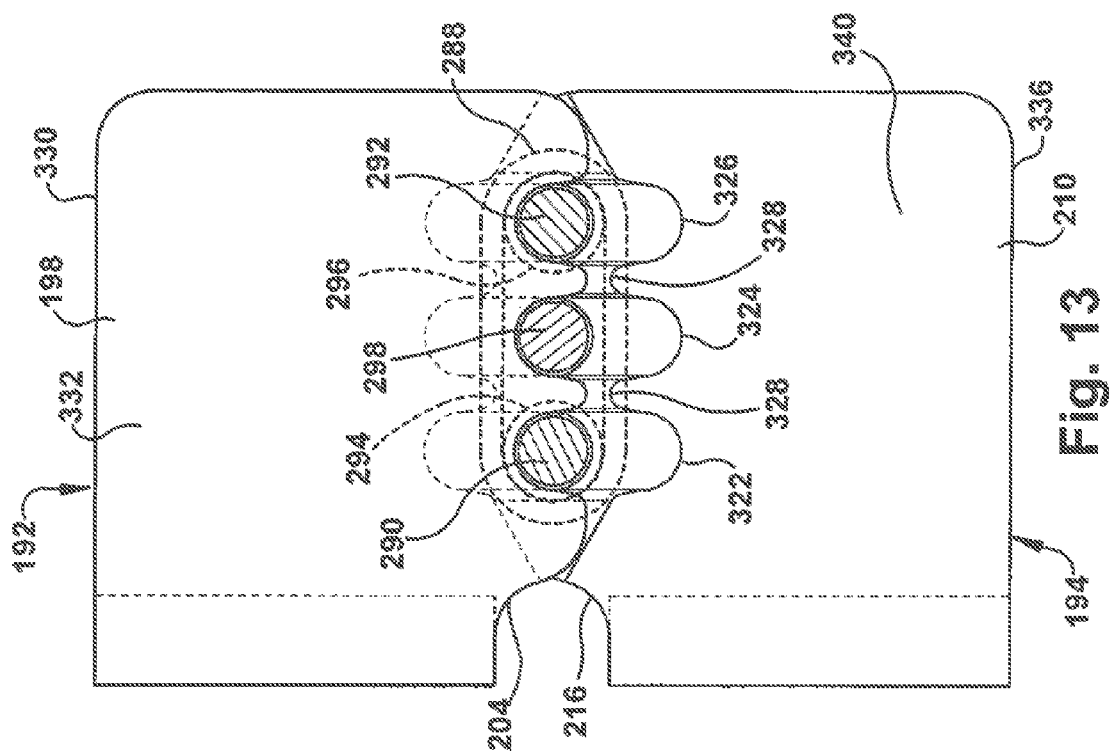
FIG. 13 is an end view of the cutting members of FIG. 7 in a closed condition.

FIG. 10 shows the profile provided on or formed on the cutting surfaces 206 and 218 of the cutting members 192 and 194 of the second pair 190 of cutting members in order to cut through the outer sheath 288 and the individual conductor insulation 294 and 296 for the conductors 290 and 292 of the sheathed cable 286 without cutting, nicking, or otherwise damaging the conductors 290, 292 and 298. The profile for each cutting surface 206 and 218 includes three semicircular arcs 322, 324, and 326 equally spaced apart from one another across the profile. The three semicircular arcs 322, 324, and 326 are configured and dimensioned to extend around or fit around the conductors 290, 292, and 298 as the cutting surfaces 206 and 218 are moved closer together after cutting through the outer sheath 288 and the individual conductor insulation 294 and 296 for the conductors 290 and 292, as shown in FIG. 13. Between adjacent semicircular arcs 322, 324, and 326 on each profile is an outwardly directed intermediate profile segment 328, which comprises a rounded point with tapered sides that transition into one of the adjacent semicircular arcs 322, 324, and 326.

As can be seen in FIG. 13, the profile of each cutting surface 206 and 218 permits the two cutting surfaces to move toward each other to cut through the outer sheath 288 and the individual conductor insulation 294 and 296 for the conductors 290 and 292 without also cutting through or otherwise damaging the conductors 290, 292, and 298. To ensure that the foregoing result is achieved, the cutting members 192 and 194 must be mounted on the first and second arms 112 and 114 such that the cutting surfaces 206 and 218 are spaced a predetermined distance apart from one another and the stop mechanism 264 must be positioned at an appropriate predetermined distance from, the first and second pivot axes 282 and 284 and the fastener 148 so as to limit the extent to which the cutting members 192 and 194 can move toward one another. It should also be apparent that if the outer sheath 288 and the individual conductor insulation 294 and 296 for the conductors 290 and 292 of a particular length of sheathed cable 286 had already been removed, the profile of each cutting surface 206 and 218 would tend to guide the conductors 290, 292, and 298 into positions in which the conductors would not be cut or otherwise damaged by the cutting surfaces. Further, the sharpness of the cutting surfaces 206 and 218 may be determined during manufacture of the cutting members 192 and 194 by considering the toughness or resistance to cutting of the outer sheath 288 and the individual conductor insulation 294 and 296 and the minimum force or load that will be required to be applied by the user to the handles 122 and 130 to enable the cutting surfaces to cut through the outer sheath and the individual conductor insulation, The sharpness of the cutting surfaces 206 and 218 will affect the tendency of the cutting surfaces to cut, nick or otherwise damage the conductors 290, 292, and 298.

FIGS. 3, 7, 10 and 13 also show that the cutting surfaces 206 and 218 are beveled or sloped. More particularly, the distance to the cutting surface 206 from an upper edge 330 of the leg 198 of the cutting member 192 is greatest at a side 332 of the leg 198 positioned closest to the cutting member 194. The distance to the cutting surface 206 from the upper edge 330 is smallest at an opposite side 334 of the leg 198. Similarly, the distance to the cutting surface 218 from a lower edge 336 of the leg 210 of the cutting member 194 is greatest at a side 338 of the leg 210 positioned closest to the cutting member 192 and the side 332 of the leg 198 of the cutting member 192. The distance to the cutting surface 21$ from the lower edge 336 is smallest at an opposite side 340 of the leg 210. As the distal ends 118 and 126 of the first and second arms 112 and 114 are moved toward each other, the side 332 of the leg 198 of the cutting member 192 will pass in close proximity to the side 338 of the leg 210 of the cutting member 194, and the two sides 332 and 338 will be touching or nearly touching when the distal ends 118 and 126 reach the end of their movement toward one another as determined by the stop mechanism 264.

FIG. 11 shows the profile provided on or formed on the cutting surfaces 236 and 248 of the cutting members 222 and 224 of the third pair 220 of cutting members in order to cut through the outer sheath 288, the individual conductor insulation 294 and 296 for the conductors 290 and 292, and the conductors 290, 292 and 298 of the sheathed cable 286. As all components of the sheathed cable 286 are to be cut completely through or severed, the profile for each cutting surface 236 and 248 is simply a straight edge. The cutting surface 248 is oriented essentially horizontally, while the cutting surface 236 is oriented at an angle to the horizontal, like the blade on a guillotine. The sharpness of the cutting surfaces 236 and 248 may be determined during manufacture of the cutting members 222 and 224 by considering the toughness or resistance to cutting of the outer sheath 288, the individual conductor insulation 294 and 296, and the conductors 290, 292 and 298, together with the minimum force or load that will be required to be applied by the user to the handles 122 and 130 to enable the cutting surfaces to cut through the outer sheath, the individual conductor insulation, and the conductors.

FIGS. 3, 8, and 11 show that the cutting surfaces 236 and 248 are beveled or sloped. More particularly, the distance to the cutting surface 236 from an upper edge 342 of the leg 228 of the cutting member 222 is greatest at a side 344 of the leg 228 positioned closest to the cutting member 224. The distance to the cutting surface 236 from the upper edge 342 is smallest at an opposite side 346 of the leg 228. Similarly, the distance to the cutting surface 248 from a lower edge 348 of the leg 240 of the cutting member 224 is greatest at a side 350 of the leg 240 positioned closest to the cutting member 222 and the side 344 of the leg 228 of the cutting member 222. The distance to the cutting surface 248 from the lower edge 348 is smallest at an opposite side 352 of the leg 240. As the distal ends 118 and 126 of the first and second arms 112 and 114 are moved toward each other, the side 344 of the leg 228 of the cutting member 222 will pass in close proximity to the side 350 of the leg 240 of the cutting member 224, and the two sides 344 and 350 will be touching or nearly touching when the distal ends 118 and 126 reach the end of their movement toward one another as determined by the stop mechanism 264.

With the length of sheathed cable 286 inserted between the cutting surfaces 176 and 188 of the cutting members 162 and 164, respectively, between the cutting surfaces 206 and 218 of the cutting members 192 and 194, respectively, and between the cutting surfaces 236 and 248 of the cutting members 222 and 224, respectively, the user of the wire stripping and cutting tool 100 applies a force or load to the handles 122 and 130 with his or her hands. The handles 122 and 130 move toward one another in response to the force or load, and the first and second arms 112 and 114 pivot about the first and second pivot axes 282 and 284 and the fastener 148. As the distal ends 118 and 126 of the first and second arms 112 and 114 are moved toward each other, the cutting snakes 176 and 1.88 of the cutting members 162 and 164, respectively, move toward each other, as do the cutting surfaces 206 and 218 of the cutting members 192 and 194, respectively, and the cutting surfaces 236 and 248 of the cutting members 222 and 224, respectively. When the movement of the handles 122 and 130 toward one another and pivoting movement of the first and second arms 112 and 114 about the first and second pivot axes 282 and 284 and the fastener 148 is halted by the stop mechanism 264, the outer sheath 288 will be cut at the first pair 160 of cutting members, the outer sheath and the individual conductor insulation 294 and 296 will be cut at the second pair 190 of cutting members, and the outer sheath, the individual conductor insulation, and the conductors 290, 292, and 298 will be cut entirely through or severed at the third pair 220 of cutting members. All of the foregoing cutting action of each of the first, second and third pairs 160, 190 and 220 of cutting members is accomplished with a single movement of the handles 122 and 130 toward one another and a single pivoting movement of the first and second arms 112 and 114 toward one another. Although the movement may not be continuous, in that the movement may be paused, there is no requirement to reverse the movement in order to change the position of the sheathed cable 286 and permit any of the first, second and third pairs 160, 190 and 220 of cutting members to accomplish or complete its cutting action.

Although the cutting action of each of the first, second and third pairs 160, 190 and 220 of cutting members is completed when the stop mechanism 264 halts movement of the handles 122 and 130 toward one another, the cutting action of each of the first, second and third pairs of cutting members is initiated sequentially at different times. Specifically, the cutting action of the second pair 190 of cutting members is initiated or started first, the cutting action of the third pair 220 of cutting members is initiated or started second, and the cutting action of the first pair 160 of cutting members is initiated or started last. In this manner, the second pair 190 of cutting members will have partially cut through the outer sheath 288 of the sheathed cable 286 and the individual conductor insulation 294 and 296 before the third pair 220 of cutting members begins to cut through the outer sheath, the individual conductor insulation, and the conductors 290, 292, and 298. As a consequence, the force that must be applied to the handles 122 and 130 to continue the cutting action of the second pair 190 of cutting members will be reduced as compared to the force required to initiate the cutting action. Thus, when the third pair 220 of cutting members begins its cutting action, the force that must be applied to the handles 122 and 130 will be greater than the force that must be applied to the handles to initiate the cutting action of just the second pair 190 of cutting members, but not as great as the sum of the force required to initiate both the cutting action of the second pair 190 of cutting members and the cutting action of the third pair 220 of cutting members.

Similarly, the second pair 190 of cutting members will have partially cut through the outer sheath 288 of the sheathed cable 286 and the individual conductor insulation 294 and 296 and the third pair 220 of cutting members will have partially cut through the outer sheath, the individual conductor insulation, and the conductors 290, 292, and 298 before the first pair 160 of cutting members begins to cut through the outer sheath. As a consequence, the force that must be applied to the handles 122 and 130 to continue the cutting action of the second pair 190 of cutting members and the third pair 220 of cutting members will be reduced as compared to the force required to initiate the cutting action of the second and third pairs of cutting members. Thus, when the first pair 160 of cutting members begins its cutting action, the force that must be applied to the handles 122 and 130 will be greater than the force that must be applied to the handles to initiate the cutting action of just the second pair 190 of cutting members or just the third pair 220 of cutting members, but not as great as the sum of the forces required to initiate all three of the cutting action of the first pair 160 of cutting members, the cutting action of the second pair 190 of cutting members and the cutting action of the third pair 220 of cutting members.

Having now completed the cutting process, the user can reduce the force or load applied to the handles 122 and 130 and allow the handles to spread apart slightly under the bias of the spring 270. At the same time, the user may apply force to the thumb plate 262 to rotate the latch plate 252 of the latch assembly 250 toward the latch pin 256 so that the latch pin is received in the notch 260. The latch assembly 250 thus is in a latched or engaged condition in which the latch assembly holds the handles 122 and 130 and the cutting surfaces 176 and 188 of the cutting members 162 and 164, respectively, the cutting surfaces 206 and 218 of the cutting members 192 and 194, respectively, and the cutting surfaces 236 and 248 of the cutting members 222 and 224, respectively, in slightly spaced apart positions. In particular, the spacing between the cutting surfaces 176 and 188 of the cutting members 162 and 164, respectively, is such that the legs of 168 and 180 of the cutting members 162 and 164, respectively, remain in contact with the now cut through outer sheath 288 of the sheathed cable 286. Similarly, the spacing between the cutting surfaces 206 and 218 of the cutting members 192 and 194, respectively, is such that the legs 198 and 210 of the cutting members 192 and 194, respectively, remain in contact with the now cut-through outer sheath 288 and the now cut-through individual conductor insulation 294 and 296 of the sheathed cable 286. By applying a force or load in opposite directions axially or along the length of the sheathed cable 286 and the wire stripping and cutting tool 100, for example, by moving the sheathed cable distally of the user and holding the wire cutting and stripping tool stationary, the user can pull or strip the now cut-through short lengths of outer sheath 288 and individual conductor insulation 294 and 296 from the remainder of the length of sheathed cable via the contact with the legs of 168 and 180 of the cutting members 162 and 164, respectively, and the legs 198 and 210 of the cutting members 192 and 194, respectively. All of the foregoing stripping action of each of the first and second pairs 160 and 190 of cutting members is accomplished with a single movement of the sheathed cable 286 and the wire stripping and cutting tool 100 away from one another. Although the movement may not be continuous, in that the movement may be paused, there is no requirement to reverse the movement in order to change the position of the sheathed cable 286 and permit either of the first and second pairs 160 and 190 of cutting members to accomplish or complete its stripping action.

Having now completed the stripping process, the user can rotate the latch plate 252 out of engagement with the latch pin 256 to permit the handles 122 and 130 and the first and second arms 112 and 114 to spread apart under the bias of the spring 270. The user can then remove the now stripped and cut sheathed cable 286 from the wire stripping and cutting tool 100.

FIGS. 14 and 15 illustrate a wire stripping and cutting tool 400 that is constructed in accordance with a second example of the present invention. The wire stripping and cutting tool 400 is similar in construction and operation to the wire stripping and cutting tool 100. Accordingly, parts and components of the wire stripping and cutting tool 400 that correspond to parts and components of the wire stripping and cutting 100 are identified with the same reference numerals increased by 300.

The wire stripping and cutting tool 400 includes a first elongated member or first arm 412 and a second elongated member or second arm 414. The first arm 412 has a proximal end 416, which is closer to the user of the wire stripping and cutting tool 400, and a distal end 418, which is farther from the user of the wire stripping and cutting tool. The length or longitudinal extent of the first arm 412 is the distance between the proximal end 416 and the distal end 418. As shown, a proximal portion 420 of the first arm 412 extends for approximately two-thirds of the length of the first arm from the proximal end 416. The proximal portion 420 is straight, unlike the proximal portion 120 of the first arm 112 of the wire stripping and cutting tool 100, and provides a handle 422 far the second arm 414 adjacent its proximal end 424. In a similar manner, the second arm 414 has a proximal end 424, which is closer to the user of the wire stripping and cutting tool 400, and a distal end 426, which is farther from the user of the wire stripping and cutting tool. The length or longitudinal extent of the second arm 114 is the distance between the proximal end 424 and the distal end 426. As shown, a proximal portion 428 of the second UM 414 extends for approximately two-thirds of the length of the second arm from the proximal end 424. The proximal portion 428 is straight, unlike the proximal portion 128 of the second arm 114 of the wire stripping and cutting tool 100, and provides a handle 430 for the second arm 414 adjacent its proximal end 424.

Each of the first and second arms 412 and 414 is substantially flat and lies in a plane. More particularly, the first arm 412 has a first major side surface 432 presented in one direction and a substantially parallel second major side surface 434 presented in an opposite direction. Extending from the proximal end 416 to the distal end 418 of the first arm 412 and generally between the first and second major side surfaces 432 and 434 is a longitudinal axis 436 (FIG. 14). Likewise, the second arm 414 has a first major side surface 438 presented in one direction and a substantially parallel second major side surface 440 presented in an opposite direction. Extending from the proximal end 424 to the distal end 426 of the second arm 414 and generally between the first and second major side surfaces 438 and 440 is a longitudinal axis 442 (FIG. 14). With the foregoing configuration, each of the first and second arms 412 and 414 may be stamped from sheet metal. At a distance of approximately one-third of the length of the first arm 412 from the distal end 418, an offset portion 444 is stamped or otherwise formed in the first arm 412. A similar substantially circular, disc-like offset portion 446 is stamped or otherwise formed at approximately the same position along the length of the second arm 414. The offset portions 444 and 446 have complementary shapes so that the first and second arms 412 and 414 can be placed side by side at the offset portions 444 and 446, but otherwise lie in the same plane, as can be seen in FIG. 14. As also can be seen in FIG. 14, the longitudinal axes 436 and 442 do not extend between their corresponding first and second major side surfaces 432, 434 and 438, 440, respectively, in the offset portions 444 and 446.

Approximately in the center of each offset portion 444 and 446 is an opening (not shown) that passes through the corresponding first or second arm 412, 414. When the first and second arms 412 and 414 are placed side by side at the offset portions 444 and 446, the opening (not shown) are axially aligned. A fastener 448 is received in the aligned openings. The fastener 448 has a shaft 450 (FIG. 14) received in the aligned openings (not shown). At one end of the shaft 450, the fastener 448 has a head 452 that is too large to pass through the aligned openings (not shown) in the offset portions 444 and 446. The shaft 450 is threaded, as is the surface of the first arm 412 that defines the opening (not shown) in the offset portion 444. The fastener 448 may thus be screwed into the opening (not shown) in the offset portion 444 to join the first arm 412 to the second arm 414 in a manner that can be undone as may be required for replacement of one of the first and second arms, for example. The shaft 450 of the fastener 448 provides an axle or shaft for pivotal movement of the first and second arms 412 and 414 relative to one another, as will be explained below.

Attached to or formed in one piece with the first and second arms 412 and 414 at the distal ends 418 and 426 of the first and second arms is a first pair 460 of cutting members. The first pair 460 of cutting members comprises two cutting members 462 and 464. Cutting member 462 is mounted at or formed at the distal end 426 of the second arm 414. The cutting member 462 is a straight member oriented substantially perpendicular to the second arm 414. The cutting member 462 has a lower edge 474 with a profiled cutting surface 476, which is substantially identical to the profiled cutting surface 176 of the cutting member 162. In a similar manner, cutting member 464 is mounted at or formed at the distal end 418 of the first arm 412. The cutting member 464 is a straight member oriented substantially perpendicular to the first arm 412. The cutting member 464 has an upper edge 486 with a profiled cutting surface 488, which is substantially identical to the profiled cutting surface 188 of the cutting member 164.

When mounted or formed on the first and second arms 412 and 414, respectively, the cutting members 464 and 462 of the first pair 460 of cutting members are configured and mounted to work together. Specifically, because the two cutting members 462 and 464 are oriented substantially perpendicular to the second and first arms 414 and 412, respectively, the cutting surfaces 488 and 476 will be oriented transverse to or, more particularly, substantially perpendicular to, the length and the longitudinal axes 442 and 436 of the second and first arms 414 and 412, respectively. Moreover, the cutting members 462 and 464 of the first pair 460 of cutting members are positioned on the second and first arms 414 and 412, respectively, such that the cutting surfaces 476 and 488 are presented toward each other. At the same time, the cutting members 462 and 464 are formed and/or positioned such that the cutting surfaces 476 and 488 will pass by one another in close proximity to one another upon relative movement of the first and second arms 412 and 414 in a direction that moves the cutting members toward one another.

Mounted to the first and second arms 412 and 414 adjacent the offset portions 444 and 446 of the first and second arms and between the offset portions and the corresponding proximal ends 416 and 424 of the first and second arms is a second pair 490 of cutting members. The second pair 490 of cutting members comprises two cutting members 492 and 494. Cutting member 492 is mounted adjacent the offset portion 444 of the first arm 412. The cutting member 492 is a straight member oriented substantially perpendicular to the first arm 412. The cutting member 492 has a lower edge 504 with a profiled cutting surface 506, which is substantially identical to the profiled cutting surface 206 of the cutting member 192. In a similar manner, cutting member 494 is mounted adjacent the offset portion 446 of the second arm 414. The cutting member 494 is a straight member oriented substantially perpendicular to the second arm 414. The cutting member 492 has an upper edge 516 with a profiled cutting surface 518, which is substantially identical to the profiled cutting surface 218 of the cutting member 194.

When mounted on the first and second arms 412 and 414, respectively, the cutting members 492 and 494 of the second pair 490 of cutting members are configured and mounted to work together. Specifically, because the two cutting members 492 and 494 are oriented substantially perpendicular to the first and second arms 412 and 414, respectively, the cutting surfaces 506 and 518 will be oriented transverse to or, more particularly, substantially perpendicular to, the length and the longitudinal axes 436 and 442 of the first and second arms 412 and 414, respectively. Moreover, the cutting members 492 and 494 of the second pair 490 of cutting members are positioned on the first and second arms 412 and 414, respectively, such that the cutting surfaces 506 and 518 are presented toward each other. At the same time, the cutting members 492 and 494 are formed and/or positioned such that the cutting surfaces 506 and 518 will pass by one another in close proximity to one another upon relative movement of the first and second arms 412 and 414 in a direction that moves the cutting members toward one another.

Mounted to the first and second arms 412 and 414 adjacent the second pair 490 of cutting members and between the second pair of cutting members and the corresponding proximal ends 416 and 424 of the first and second arms is a third pair 520 of cutting members. The third pair 520 of cutting members comprises two cutting members 522 and 524. Cutting member 522 is mounted adjacent the cutting member 492 of the second pair 490 of cutting members. Cutting member 522 is also connected to the cutting member 492 by a straight connecting member 660. Together, the cutting member 492, the cutting member 522, and the connecting member 660 have an overall shape like a "U." The connecting member 660 may be attached to the first arm 412 to mount the cutting members 492 and 522 on the first arm. The cutting member 522 is a straight member oriented substantially perpendicular to the first arm 412. The cutting member 522 has a lower edge 534 with a profiled cutting surface 536, which is substantially identical to the profiled cutting surface 236 of the cutting member 222. In a similar manner, cutting member 524 is mounted adjacent the cutting member 494 of the second pair 490 of cutting members. Cutting member 524 is also connected to the cutting member 494 by a straight connecting member 662. Together, the cutting member 494, the cutting member 524, and the connecting member 662 have an overall shape like a "U." The connecting member 662 may be attached to the second arm 414 to mount the cutting members 494 and 524 on the second arm. The cutting member 524 is a straight member oriented substantially perpendicular to the second arm 414. The cutting member 524 has upper edge 546 with a profiled cutting surface 548, which is substantially identical to the profiled cutting surface 248 of the cutting member 224.

When mounted on the first and second arms 412 and 414, respectively, the cutting members 522 and 524 of the third pair 520 of cutting members are configured and mounted to work together. Specifically, because the two cutting members 522 and 524 are oriented substantially perpendicular to the first and second arms 412 and 414, respectively, the cutting surfaces 536 and 548 will be oriented transverse to or, more particularly, substantially perpendicular to, the length and the longitudinal axes 436 and 442 of the first and second arms 412 and 414, respectively. Moreover, the cutting members 522 and 524 of the third pair 520 of cutting members are positioned on the first and second arms 412 and 414, respectively, such that the cutting surfaces 536 and 548 are presented toward each other. At the same time, the cutting members 522 and 524 are formed and/or positioned such that the cutting surfaces 536 and 548 will pass by one another in close proximity to one another upon relative movement of the first and second arms 412 and 414 in a direction that moves the cutting members toward one another.

Mounted to the first and second arms 412 and 414 adjacent the third pair 530 of cutting members and between the third pair of cutting members and the corresponding proximal ends 416 and 424 of the first and second arms is a trigger mechanism or latch assembly 550. The latch assembly 550 (which is not shown in FIG. 14) includes a latch plate 552, a pivot pin 554, a latch pin 556, and a latch spring 664. The latch plate 552 is an elongated flat member and has a circular opening (not shown) adjacent one end and a notch 560 adjacent the opposite end. The circular opening (not shown) is dimensioned and configured to receive the pivot pin 554, which is mounted in a permanent and non-removable manner to the second arm 414 so as to project substantially perpendicular to the length and longitudinal axis 442 of the second arm. When the pivot pin 554 is received in the circular opening (not shown), the latch plate 552 is pivotally mounted on the pivot pin in a permanent and non-removable manner. The notch 560 is dimensioned and configured to receive the latch pin 556, which is mounted in a permanent and non-removable manner to the first arm 412 so as to project substantially perpendicular to the length and longitudinal axis 436 of the first arm. Unlike the notch 260 of the latch plate 252 of the wire stripping and cutting tool 100, the notch 560 has an orientation that is downwardly sloping, as viewed in FIG. 15. With such a downward sloping orientation, the notch 560 will tend to allow the latch pin 556 to pass by and not engage the notch when the latch pin is moving in a downward direction relative to the latch plate 552. When the latch pin 256 is received in the notch 560, the first and second arms 412 and 414 are spaced apart a small, predetermined distance, as will be explained in greater detail hereafter. The latch spring 664, which is mounted so as to encircle the pivot pin 554, resiliently biases the latch plate 552 to pivot around the pivot pin toward a position in which the latch pin 256 is received in the notch 560. To assist in pivoting the latch plate 552 so as to move the latch pin 556 out of the notch 560, a thumb plate 562 is secured to or formed in one piece with the latch plate in a manner so as to project substantially perpendicular to the length and longitudinal axis 442 of the second arm 414.

Formed on the first and second arms 412 and 414 adjacent the distal ends 418 and 426 of the first and second arms is a stop mechanism 564. As shown, the stop mechanism 564 includes a surface 566 on a low upper edge of the first arm 412 and a surface 568 on a lower edge of the second arm 414. When the proximal portion 420 of the first arm 412 and a proximal portion 428 of the second arm 414 are pivoted toward each other, the surfaces 566 and 568 will interfere with one another by contacting one another after the proximal portions of the first and second arms have moved so as to be in a predetermined position relative to one another. The contact between the surfaces 566 and 568 will limit or prevent further movement of the proximal portions 420 and 428 of the first and second arms 412 and 414 toward each other. As will be explained in further detail hereafter, the contact between the surfaces 566 and 568 will also limit or prevent further movement of the distal ends 418 and 426 of the first and second arms 412 and 414, respectively, toward each other, as well as movement of the cutting surfaces 476 and 488 of the cutting members 462 and 464, respectively, toward each other, movement of the cutting surfaces 506 and 518 of the cutting members 492 and 494, respectively, toward each other, and movement of the cutting surfaces 536 and 548 of the cutting members 522 and 524, respectively, toward each other.

In order to bias the first and second arms 412 and 414 away from each other and thus to bias the cutting surfaces 476 and 488 of the cutting members 462 and 464, respectively, the cutting surfaces 506 and 518 of the cutting members 492 and 494, respectively, and the cutting surfaces 536 and 548 of the cutting members 522 and 524, respectively, away each other to facilitate use of the wire stripping and cutting tool 400 and, particularly, insertion of an electrical cable into the wire stripping and cutting tool, a spring 570 is mounted to the first and second arms. As shown, the spring 570 is a coil spring captured between the offset portions 444 and 446 of the fast and second arms 412 and 414 adjacent to but offset from the fastener 448.

When the wire stripping and cutting tool 400 is assembled, the fastener 448 is received in the aligned openings (not shown) in the offset portions 444 and 446 of the first and second arms 412 and 414, respectively. The first arm 412 is thus mounted to pivot about a first pivot axis 582 (FIG. 14) that passes through the opening (not shown) in the center of the offset portion 444 of the first arm. The second arm 414 is likewise mounted to pivot about a second pivot axis 584 (FIG. 14) that passes through the opening (not shown) in the center of the offset portion 446 of the second arm. As shown, the first and second pivot axes 582 and 584 are aligned and coaxial. The first and second pivot axes 582 and 584 are also aligned with and coaxial with the length of the fastener 448. The first and second arms 412 and 414 are also arranged in a scissor-like manner. More particularly, the distal end 426 of the second arm 414 is disposed above, as viewed in FIG. 15, the distal end 418 of the first arm 412. The proximal portion 420 of the first sun 412 is disposed above, as viewed in FIG. 15, the proximal portion 428 of the second arm 414. Movement of the handle 422 of the first arm 412 toward the handle 430 of the second arm 414 will thus cause the distal end 418 of the first arm to move toward the distal end 426 of the second arm. Such movement of the handles 422 and 430 will also cause movement of the cutting surfaces 476 and 488 of the cutting members 462 and 464, respectively, toward each other, movement of the cutting surfaces 506 and 518 of the cutting members 492 and 494, respectively, toward each other, and movement of the cutting surfaces 536 and 548 of the cutting members 522 and 524, respectively, toward each other. Such movement of the handles 422 and 430 will also be against the biasing action of the spring 570, which biases the handles 422 and 430 away from each other.

In use, the wire stripping and cutting tool 400 is intended to be employed as a hand tool to strip and cut non-metallic sheathed cable, like the wire stripping and cutting tool 100 of FIGS. 1-13. The wire stripping and cutting tool 400 functions in the same manner as the wire stripping and cutting tool 100, except that the latch spring 664 tends to bias the latch plate 252 to engage the latch pin 256 when the force or load on the handles 422 and 430 is reduced by the user after the cutting process but before the stripping process. With the wire stripping and cutting tool 100, the user applies force to the thumb plate 262 to rotate the latch plate 252 of the latch assembly 250 toward the latch pin 256 so that the latch pin is received in the notch 260.

Figure 16:
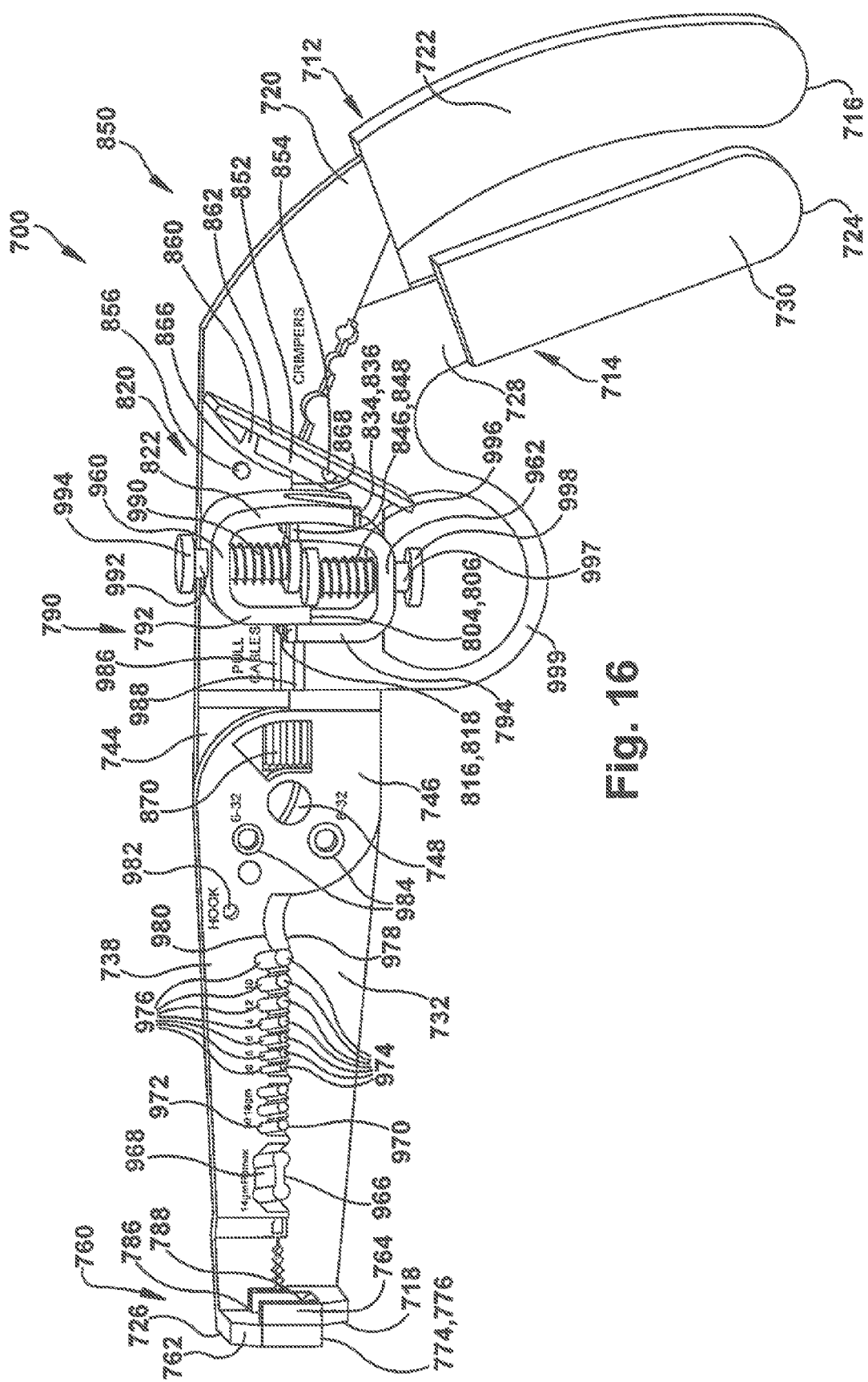
FIG. 16 is a perspective view of a third embodiment of a wire stripping and cutting tool accordance with the present invention. in a closed condition.

FIG. 16 illustrates a wire stripping and cutting tool 700 that is constructed in accordance with a third example of the present invention. The wire stripping and cutting tool 700 is broadly similar in construction to the wire stripping and cutting tool 100. Accordingly, parts and components of the wire stripping and cutting tool 700 that correspond to parts and components of the wire stripping and cutting 100 are identified with the same reference numerals increased by 600.

The wire stripping and cutting tool 700 includes a first elongated member or first arm 712 and a second elongated member or second arm 714. The first arm 712 has a proximal end 716, which is closer to the user of the wire cutting and stripping tool 700, and a distal end 718, which is farther from the user of the wire cutting and stripping tool. The length or longitudinal extent of the first arm 712 is the distance between the proximal end 716 and the distal end 718. As shown, a proximal portion 720 of the first arm 712 extends for approximately two-thirds of the length of the first arm from the proximal end 716. Approximately half-way along the along its length, the proximal portion 720 is bent at about a 75° angle, which provides a handle 722 for the first arm 712 adjacent its proximal end 716. In a similar manner, the second arm 714 has a proximal end 724, which is closer to the user of the wire cutting and stripping tool 700, and a distal and 726, which is farther from the user of the wire cutting and stripping tool. The length or longitudinal extent of the second area 714 is the distance between the proximal end 724 and the distal end 726. As shown, a proximal portion 728 of the second arm 714 extends for approximately two-thirds of the length of the second arm from the proximal end 724. Approximately half-way along the along its length, the proximal portion 728 is bent at about a 75° angle, which provides a handle 730 for the second arm 714 adjacent its proximal end 724.

Each of the first and second arms 712 and 714 is substantially flat and lies in a plane. More particularly, the first arm 712 has a first major side surface 732 presented in one direction and a substantially parallel second major side surface (not shown) presented in an opposite direction. Extending from the proximal end 716 to the distal end 718 of the first arm 712 and generally between the first and second major side surfaces is a longitudinal axis. Likewise, the second arm 714 has a first major side surface 438 presented in one direction and a substantially parallel second major side surface (not shown) presented in an opposite direction. Extending from the proximal end 724 to the distal end 726 of the second arm 714 and generally between the first and second major side surfaces is a longitudinal axis. With the foregoing configuration, each of the first and second arms 712 and 714 may be stamped from sheet metal. At a distance of approximately one-third of the length of the first arm 712 from the distal end 718, an offset portion 744 is stamped or otherwise formed in the first arm 712. A similar substantially circular, disc-like offset portion 746 is stamped or otherwise formed at approximately the same position along the length of the second arm 714. The offset portions 744 and 746 have complementary shapes so that the first and second arms 712 and 714 can be placed side by side at the offset portions 744 and 746, but otherwise lie in the same plane. Also, the longitudinal axes do not extend between their corresponding first and second major side surfaces in the offset portions 744 and 746.

Approximately in the center of each offset portion 744 and 746 is an opening (not shown) that passes through the corresponding first or second arm 712, 714. When the first and second arms 712 and 714 are placed side by side at the offset portions 744 and 746, the opening (not shown) are axially aligned. A fastener 748 is received in the aligned openings. The fastener 748 provides an axle or shaft for pivotal movement of the first and second arms 712 and 714 relative to one another, as will be explained below.

Attached to or formed in one piece with the first and second arms 712 and 714 at the distal ends 718 and 726 of the first and second arms is a first pair 760 of cutting members. The first pair 760 of cutting members comprises two cutting members 762 and 764. Cutting member 762 is mounted at or formed at the distal end 726 of the second arm 714. The cutting member 762 is a straight member oriented substantially perpendicular to the second arm 714. The cutting member 762 has a lower edge 774 with a profiled cutting surface 776, which is substantially identical to the profiled cutting surface 176 of the cutting member 162, in a similar manner, cutting member 764 is mounted at or formed at the distal end 718 of the first arm 712. The cutting member 764 is a straight member oriented substantially perpendicular to the first arm 712. The cutting member 464 has an upper edge 786 with a profiled cutting surface 788, which is substantially identical to the profiled cutting surface 188 of the cutting member 164.

When mounted or formed on the first and second arms 712 and 714, respectively, the cutting members 764 and 762 of the first pair 760 of cutting members are configured and mounted to work together. Specifically, because the two cutting members 762 and 764 are oriented substantially perpendicular to the second and first arms 714 and 712, respectively, the cutting surfaces 788 and 776 will be oriented transverse to or, more particularly, substantially perpendicular to, the length and the longitudinal axes of the second and first arms. Moreover, the cutting members 762 and 764 of the first pair 760 of cutting members are positioned on the second and first arms 714 and 712, respectively, such that the cutting surfaces 776 and 788 are presented toward each other. At the same time, the cutting members 762 and 764 are fanned and/or positioned such that the cutting surfaces 776 and 788 will pass by one another in close proximity to one another upon relative movement of the first and second arms 712 and 714 in a direction that moves the cutting members toward one another.

Formed on the first and second arms 712 and 714 between the offset portions 744 and 746 and the corresponding distal ends 718 and 726 of the first and second arms are additional sets of cutting surfaces. Closest to the first pair 760 of cutting members is a pair of outer sheath cutting surfaces 966 and 968 shaped like the cutting surfaces 176 and 188 of the wire stripping and cutting tool 100. Adjacent to the cutting surfaces 966 and 968 and closer to the offset portions 744 and 746 is a pair of cutting surfaces 970 and 972 like the cutting surfaces 206 and 218 of the wire stripping and cutting tool 100. Adjacent to the cutting surfaces 970 and 972 and closer still to the offset portions 744 and 746 is a series of seven cutting surfaces 974 formed in the first arm 712 and a complementary series of seven cutting surfaces 976 formed on the second arm 714 for cutting and stripping the individual conductor insulation from conductors of seven different diameters or gauges. Adjacent to the cutting surfaces 974 and 976 and yet closer still to the offset portions 744 and 746 is an arcuate cutting surface 978 formed in the first arm 712 and a complementary arcuate cutting surface 980 formed on the second arm 714 for shear cutting. Also formed in the second arm 714 above the arcuate cutting surface 980 is a hole or opening 982 for receiving an end of a conductor to form a hook or bend in the conductor. As another feature, two screw cutting openings 984 are formed in the first and second arms 712 and 714 adjacent to the cutting surfaces 978 and 980 and in the offset portions 744 and 746. Further, adjacent to the offset portions 744 and 746 and between the offset portions and the corresponding proximal ends 716 and 724 of the first and second arms 712 and 714 are a flat clamping surface 986 formed in the first arm 712 and a complementary flat clamping surface 988 formed on the second arm 714. Together, the clamping surfaces 986 and 988 allow the user of the wire stripping and cutting tool 700 to clamp a sheathed cable between the clamping surfaces and then apply a pulling force or load to the sheathed cable by gripping the wire stripping and cutting tool 700 by its handles 722 and 730 and the distal ends 718 and 726 of its first and second arms 712 and 714 to pull the sheathed cable through a conduit, holes in wall studs, and/or an open space.

Mounted to the first and second arms 712 and 714 adjacent the clamping surfaces 986 and 988 and between the clamping surfaces 986 and 988 and the proximal ends 716 and 724 of the first and second arms is a second pair 790 of cutting members. The second pair 790 of cutting members comprises two cutting members 792 and 794. Cutting member 792 is mounted adjacent the clamping surface 986 of the first arm 712. The cutting member 792 is a straight member oriented substantially perpendicular to the first arm 712. The cutting member 792 has a lower edge 804 with a profiled cutting surface 806, which is substantially identical to the profiled cutting surface 206 of the cutting member 192. In a similar manner, cutting member 794 is mounted adjacent the clamping surface 988 of the second arm 714. The cutting member 794 is a straight member oriented substantially perpendicular to the second arm 714. The cutting member 792 has an upper edge 816 with a profiled cutting surface 818, which is substantially identical to the profiled cutting surface 218 of the cutting member 194.

When mounted on the first and second arms 712 and 714, respectively, the cutting members 792 and 794 of the second pair 790 of cutting members are configured and mounted to work together. Specifically, because the two cutting members 792 and 794 are oriented substantially perpendicular to the first and second arms 712 and 714, respectively, the cutting surfaces 806 and 818 will be oriented transverse to or, more particularly, substantially perpendicular to, the length and the longitudinal axes of the first and second arms 712 and 714, respectively. Moreover, the cutting members 792 and 794 of the second pair 790 of cutting members are positioned on the first and second arms 712 and 714, respectively, such that the cutting surfaces 806 and 818 are presented toward each other. At the same time, the cutting members 792 and 794 are formed and/or positioned such that the cutting surfaces 806 and 818 will pass by one another in close proximity to one another upon relative movement of the first and second arms 712 and 714 in a direction that moves the cutting members toward one another.

Mounted to the first and second arms 712 and 714 adjacent the second pair 790 of cutting members and between the second pair of cutting members and the corresponding proximal ends 716 and 724 of the first and second arms is a third pair 820 of cutting members. The third pair 820 of cutting members comprises two cutting members 822 and 824. Cutting member 822 is mounted adjacent the cutting member 792 of the second pair 790 of cutting members. Cutting member 822 is also connected to the cutting member 792 by a curved connecting member 960. Together, the cutting member 792, the cutting member 822, and the connecting member 960 have an overall shape like a "U." The connecting member 960 may be attached to the first arm 712 to mount the cutting members 792 and 822 on the first arm. The cutting member 822 is a straight member oriented substantially perpendicular to the first arm 712. The cutting member 822 has a lower edge 834 with a profiled cutting surface 836, which is substantially identical to the profiled cutting surface 236 of the cutting member 222. In a similar manner, cutting member 824 is mounted adjacent the cutting member 794 of the second pair 790 of cutting members. Cutting member 824 is also connected to the cutting member 794 by a curved connecting member 962. Together, the cutting member 794, the cutting member 824, and the connecting member 962 have an overall shape like a "U." The connecting member 962 may be attached to the second arm 714 to mount the cutting members 794 and 824 on the second arm. The cutting member 824 is a straight member oriented substantially perpendicular to the second arm 714. The cutting member 824 has upper edge 846 with a profiled cutting surface 848, which is substantially identical to the profiled cutting surface 248 of the cutting member 224.

When mounted on the first and second arms 712 and 714, respectively, the cutting members 822 and 824 of the third pair 820 of cutting members are configured and mounted to work together. Specifically, because the two cutting members 822 and 824 are oriented substantially perpendicular to the first and second arms 712 and 714, respectively, the cutting surfaces 836 and 848 will be oriented transverse to or, more particularly, substantially perpendicular to, the length and the longitudinal axes 736 and 742 of the first and second arms 712 and 714, respectively. Moreover, the cutting members 822 and 824 of the third pair 820 of cutting members are positioned on the first and second arms 712 and 714, respectively, such that the cutting surfaces 836 and 848 are presented toward each other. At the same time, the cutting members 822 and 824 are formed and/or positioned such that the cutting surfaces 836 and 848 will pass by one another in close proximity to one another upon relative movement of the first and second arms 712 and 714 in a direction that moves the cutting members toward one another.

Mounted to the first and second arms 712 and 714 adjacent the third pair 830 of cutting members and between the third pair of cutting members and the corresponding proximal ends 716 and 724 of the first and second arms is a trigger mechanism or latch assembly 850. The latch assembly 850 includes a latch plate 852, a pivot pin 854, and a latch pin 856. The latch plate 852 is an elongated flat member and has a circular opening 858 adjacent one end and a notch 860 adjacent the opposite end. The circular opening 858 is dimensioned and configured to receive the pivot pin 854, which is mounted in a permanent and non-removable manner to the second arm 714 so as to project substantially perpendicular to the length and longitudinal axis of the second arm. When the pivot pin 854 is received in the circular opening 858, the latch plate 852 is pivotally mounted on the pivot pin in a permanent and non-removable manner. The notch 860 is dimensioned and configured to receive the latch pin 856, which is mounted in a permanent and non-removable manner to the first arm 712 so as to project substantially perpendicular to the length and longitudinal axis of the first arm. When the latch pin 856 is received in the notch 860, the first and second arms 712 and 714 are spaced apart a small, predetermined distance, as will be explained in greater detail hereafter. To assist in pivoting the latch plate 852 so as to move the latch pin 856 into and out of the notch 860, a thumb plate 862 is secured to or formed in one piece with the latch plate in a manner so as to project substantially perpendicular to the length and longitudinal axis of the second arm 714.

Formed on the first and second arms 712 and 714 adjacent the latch assembly 850 is a stop mechanism 864. As shown, the stop mechanism 864 includes a surface 866 on a lower edge of the first arm 712 and a surface 868 on an upper edge of the second arm 714. When the proximal portion 720 of the first arm 712 and a proximal portion 724 of the second arm 714 are pivoted toward each other, the surfaces 866 and 868 will interfere with one another by contacting one another after the proximal portions of the first and second arms have moved so as to be a predetermined distance apart. The contact between the surfaces 866 and 868 will limit or prevent further movement of the proximal portions 720 and 728 of the first and second arms 712 and 714 toward each other. As will be explained in further detail hereafter, the contact between the surfaces 866 and 868 will also limit or prevent further movement of the distal ends 718 and 726 of the first and second arms 712 and 714, respectively, toward each other, as well as movement of the cutting surfaces 776 and 788 of the cutting members 762 and 764, respectively, toward each other, movement of the cutting surfaces 806 and 818 of the cutting members 792 and 794, respectively, toward each other, and movement of the cutting surfaces 836 and 848 of the cutting members 822 and 824, respectively, toward each other.

In order to bias the first and second arms 712 and 714 away from each other and thus to bias the cutting surfaces 776 and 788 of the cutting members 762 and 764, respectively, the cutting surfaces 806 and 818 of the cutting members 792 and 794, respectively, and the cutting surfaces 836 and 848 of the cutting members 822 and 824, respectively, away each other to facilitate use of the wire stripping and cutting tool 700 and, particularly, insertion of an electrical cable into the wire stripping and cutting tool, a spring 870 is mounted to the first and second arms. As shown, the spring 870 is a coil spring captured between the offset portions 744 and 746 of the first and second arms 712 and 714 adjacent to but offset from the fastener 748. To assist the spring 870, a first supplemental spring 990 is mounted on a first shaft 992 with two enlarged ends 994. The first shaft 992 passes through an opening (not shown) in the connecting member 960 with one enlarged end 994 located above, as viewed in FIG. 16, the connecting men her and the other enlarged end 994 located below, as viewed in FIG. 16, the connecting member. The first supplemental spring 990 is positioned to press the first shaft 992 in a downward direction. Similarly, a second supplemental spring 996 is mounted on a second shaft 997 with two enlarged ends 998. The second shaft 997 passes through an opening (not shown) in the connecting member 962 with one enlarged end 998 located above, as viewed in FIG. 16, the connecting member and the other enlarged end 998 located below, as viewed in FIG. 16, the connecting member. The second supplemental spring 996 is positioned to press the second shaft 997 in an upward direction. As can be seen, the lower enlarged end 994 of the first shaft 992 contacts the upper enlarged end 998 of the second shaft 997 so as to bias the two connecting members 960 and 962 away from one another.

Extending below the first and second supplemental springs 990 and 996 and below the second and third pairs 790 and 820 of cutting members is a "trigger guard" or finger loop 999 of rigid material. The finger loop 999 provides an additional mechanism for a user to grip the wire stripping and cutting tool 700. The finger loop 999 also provides a mechanism for a user to hold the wire stripping and cutting tool 700 with only one finger so that, for example, the wire stripping and cutting tool need not be laid down in order for the user to perform some other function with the rest of his or her hand.

When the wire snipping and cutting tool 700 is assembled, the fastener 748 is received in the aligned openings (not shown) in the offset portions 744 and 746 of the first and second arms 712 and 714, respectively. The first arm 712 is thus mounted to pivot about a first pivot axis that passes through the opening (not shown) in the center of the offset portion 744 of the first arm. The second arm 714 is likewise mounted to pivot about a second pivot axis that passes through the opening (not shown) in the center of the offset portion 746 of the second arm. The first and second pivot axes are aligned and coaxial. The first and second pivot axes are also Aped with and coaxial with the length of the fastener 748. The first and second arms 712 and 714 are also arranged in a scissor-like manner. More particularly, the distal end 726 of the second arm 714 is disposed above, as viewed in FIG. 16, the distal end 718 of the first arm 712. The proximal portion 720 of the first arm 712 is disposed above, as viewed in FIG. 16, the proximal portion 728 of the second arm 714. Movement of the handle 722 of the first arm 712 toward the handle 730 of the second arm 714 will thus cause the distal end 718 of the first arm to move toward the distal end 726 of the second arm. Such movement of the handles 722 and 730 will also cause movement of the cutting surfaces 776 and 788 of the cutting members 762 and 764, respectively, toward each other, movement of the cutting surfaces 806 and 818 of the cutting members 792 and 794, respectively, toward each other, and movement of the cutting surfaces 836 and 848 of the cutting members 822 and 824, respectively, toward each other. Such movement of the handles 722 and 730 will also be against the biasing action of the spring 870, which biases the handles 722 and 730 away from each other.

In use, the wire stripping and cutting tool 700 is intended to be employed as a hand tool to strip and out non-metallic sheathed cable, like the wire stripping and cutting tool 100 of FIGS. 1-13. The wire stripping and cutting tool 700 functions in the same manner as the wire stripping and cutting tool 100.

FIGS. 17 and 17A illustrate a wire stripping and cutting tool 700' that is substantially the same in construction as the wire stripping and cutting tool 700. Accordingly, parts and components of the wire stripping and cutting tool 700' that correspond to parts and components of the wire stripping and cutting tool 700 are identified with the same reference numerals. Where parts and components of the wire stripping and cutting tool 700' correspond to parts and components of the wire stripping and cutting tool 700, but are described hereafter as having different structures or functions, such parts and components are identified with the same reference numerals and an added prime (').

The primary difference between the wire stripping and cutting tool 700' and the wire stripping and cutting tool 700 is that the surfaces 776' and 788' of the wire stripping and cutting tool 700' are not cutting surfaces, but are guide surfaces. Specifically, the guide surfaces 776' and 788' are not sharpened for cutting and, as can be seen in FIG. 17A, together form a rectangle with rounded ends or an oval when the wire stripping and cutting tool 700' is in a closed position with its handles 722 and 730 and the guide surfaces 776' and 788' as close together as the tool permits. With such a combined shape, the guide surfaces 776' and 788' help to guide two or more separate conductors covered with individual conductor insulation into a side-by-side alignment for presentation to the cutting surfaces 806' and 818' of the second pair 790 of cutting members. In other words, the guide surfaces 776' and 788' are shaped and dimensioned to guide the conductors into a predetermined orientation relative to one another as the conductors are extended, as by being pushed or pulled, lengthwise between the guide surfaces. The predetermined orientation is such that the cutting surfaces 806' and 818' of the second pair 790 of cutting members wits cut through the individual conductor insulation covering each of the conductors without cutting the conductors. The cutting surfaces 806' and 818' of the second pair 790 of cutting members and the cutting surfaces 836' and 848' of the third pair 820 of cutting members perform the same cutting and stripping tasks as the counterpart surfaces 806, 818, 836, and 848 of the wire stripping and cutting tool 700, but may be shaped and dimensioned to handle a different number of electrical conductors or electrical conductors with a larger diameter or larger gauge.

Although the cutting members 792 and 794 of the wire stripping and cutting tool 700' are described above as being a "second" pair 790 of cutting member and the cutting members 822 and 824 of the wire stripping and cutting tool 700' are described as being a "third" pair 220 of cutting member, this description is merely to facilitate a description of the wire stripping and cutting tool 700' without repeating all of the description of the wire stripping and cutting tool 700, as the wire stripping and cutting tool 700' has only two pairs of cutting members. More particularly, in this regard, the members 762 and 764 of the wire stripping and cutting tool 700', which are the same as the cutting members 762 and 764 of the wire stripping and cutting tool 700, except for the surfaces 776' and 788', are guide members, rather than cutting members.

Another difference between the stripping and cutting tools 700 and 700' is that the cutting surfaces 974' and 976' are configured and dimensioned for cutting and stripping the individual conductor insulation from pairs of conductors of three different diameters or gauges A further difference is that the cutting surfaces 970' and 972' are a series of five cutting surfaces 970' formed in the first arm 712 and a complementary series of five cutting surfaces 972' formed on the second mu 714 for cutting and stripping the individual conductor insulation from conductors of five different diameters or gauges.

In each of the wire stripping and cutting tools 100, 400, 700, and 700', the separation or spacing between the various pairs of cutting members along the length of the tools and along the length of their first and second arms can be established or determined in accordance with the intended use of the tool and applicable electrical codes or similar legal requirements. For example, in one particular embodiment of a wire stripper and cutter in accordance with FIGS. 14 and 15, which is intended for use with non-metallic sheathed cable for residential construction, the first pair 460 of cutting members is located at a distance of 5½ inches from the third pair 520 of cutting members. The second pair 490 of cutting members is located at a distance of ½ inch from the third pair 520 of cutting members. The numerical values set forth above and other numerical values set forth in the present application are given by way of example only and other values may be used with satisfactory results.

It is also possible to provide different profiles for the various cutting surfaces included in each of the wire stripping and cutting tools 100, 400, 700, and 700'. For example, the profiles of the cutting surfaces 176 and 188, the cutting surfaces 206 and 218, and the cutting surfaces 236 and 248 of the wire stripping and cutting tool 100, which are shown in detail in FIGS. 6-13, are designed for use with non-metallic sheathed cable in which an outer sheath surrounds two conductors with individual conductor insulation positioned side-by-side within the outer sheath and separated by an uninsulated conductor. Other designs of sheathed cables are used, however, and the profiles of the various cutting surfaces can be varied to accommodate other sheathed cables, such as an outer sheath surrounding three conductors with individual conductor insulation positioned side-by-side within the outer sheath together with an uninsulated conductor. Further, the guide surfaces 776' and 788' of the wire snipping and cutting tool 700' could be substituted for the cutting surfaces 176 and 188 or the cutting surfaces 476 and 488 or the cutting surfaces 776 and 788 if it were desired to have the wire stripping and cutting tools 100, 400, and 700, respectively, usable with separate, unsheathed conductors with individual conductor insulation. Still further, the wire stripping and cutting tools 100, 400, and 700 may be used with conductors that have individual conductor insulation and an outer jacket for each conductor, which outer jacket is formed of a material with different properties than the individual conductor insulation or is a different material than the individual conductor insulation. As used in this application, the word "sheath" includes such an outer jacket.

Although the cutting members 162 and 164, the cutting members 192 and 194, and the cutting members 222 and 224 of the wire stripping and cutting tool 100 are shown being attached to the first and second arms 112 and 114 with fasteners 172, 184, 202, 214, 232, and 244 having heads configured to received a drive mechanism with a hexagonal drive tip, other fasteners with heads configured to receive other shapes of drive tips, such as a "Phillips" drive tip, can be used. In addition, while the fasteners 172, 184, 202, 214, 232, and 244 are removable to permit the cutting members 162, 164, 192, 194, 222 and 224 to be removed and replace, the fasteners may be permanently or non-removable secured to the first and second arms 112 and 114 to prevent the cutting members from shifting or being removed and either replaced or re-attached incorrectly by the user. In this regard, the wire stripping and cutting tool 100 includes several positioning members 360 to help ensure that the cutting members 162, 164, 192, 194, 222 and 224 are properly positioned and held against rotation relative to the first and second arms 112 and 114. In a similar manner, the outer sheath cutting surfaces 966 and 968, the cutting surfaces 970 and 972, the cutting surfaces 974 and 976, the arcuate cutting surfaces 978 and 980, the clamping surfaces 986 and 988, the cutting surfaces 974' and 976', and the cutting surfaces 970 and 972' may be formed on or in the first and second arms 712 and 714, as shown, or may be formed on or in separate members that are either permanently or removable attached to the first, and second arms.

From the above description of the invention, those skilled in the art will perceive improvements, changes and modifications. Such improvements, changes, and/or modifications within the skill of the art are intended to be covered by the appended claims.

Having described the invention, the following is claimed:

1. An electrical conductor stripping and cutting tool comprising:
    a first elongated member having a proximal end and a longitudinally opposite distal end and a length extending from the proximal end to the distal end;
    a second elongated member having a proximal end and a longitudinally opposite distal end and a length extending from the proximal end of the second elongated member to the distal end of the second elongated member, the second elongated member being joined to the first elongated member such that the first and second elongated members are pivotable about a pivot axis relative to each other;
    a first pair of cutting members mounted on the first and second elongated members, one of the first pair of cutting members being mounted on the first elongated member such that the pivot axis is disposed between said one of the first pair of cutting members and the proximal end of the first elongated member, the other of the first pair of cutting members being mounted on the second elongated member such that the pivot axis is disposed between said other of the first pair of cutting members and the proximal end of the second elongated member, each of the first pair of cutting members having an L-shape with a cutting surface oriented transverse to the length of the first elongated member and the length of the second elongated member, each cutting surface of the first pair of cutting members being presented toward the other cutting surface of the first pair of cutting members, the cutting surfaces of the first pair of cutting members moving toward one another upon pivotal movement of the first and second elongated members about the pivot axis relative to each other such that the proximal end of the first elongated member and the proximal end of the second elongated member move toward one another; and
    a second pair of cutting members mounted on the first and second elongated members, one of the second pair of cutting members being mounted on the first elongated member in a position between the proximal end of the first elongated member and the pivot axis, the other of the second pair of cutting members being mounted on the second elongated member in a position between the proximal end of the second elongated member and the pivot axis, each of the second pair of cutting members having a cutting surface oriented transverse to the length of the first elongated member and the length of the second elongated member, each cutting surface of the second pair of cutting members being presented toward the other cutting surface of the second pair of cutting members, the cutting surfaces of the second pair of cutting members moving toward one another upon pivotal movement of the first and second elongated members about the pivot axis relative to each other such that the proximal end of the first elongated member and the proximal end of the second elongated member move toward one another,
    the cutting surfaces of the first pair of cutting members being shaped and dimensioned to cut through material surrounding the electrical conductor without cutting the conductor when the conductor extends longitudinally from a position between the first pair of cutting members to a position between the second pair of cutting members,
    the cutting surfaces of the second pair of cutting members being shaped and dimensioned to cut through material surrounding an electrical conductor and also cut through the conductor when the conductor extends longitudinally from a position between the first pair of cutting members to a position between the second pair of cutting members.

2. An electrical conductor stripping and cutting tool according to claim 1 further comprising a third pair of cutting members mounted on the first and second elongated members, one of the third pair of cutting members being mounted on the first elongated member in a position between the second pair of cutting members and the pivot axis, the other of the third pair of cutting members being mounted on the second elongated member in a position between the second pair of cutting members and the pivot axis, each of the third pair of cutting members having a cutting surface oriented transverse to the length of the first elongated member and the length of the second elongated member, each cutting surface of the third pair of cutting members being presented toward the other cutting surface of the third pair of cutting members,
    the cutting surfaces of the first pair of cutting members being shaped and dimensioned to cut through material that is an outer sheath for at least one electrical conductor covered with individual conductor insulation without cutting through the individual conductor insulation and without cutting the conductor when the conductor extends longitudinally from a position between the first pair of cutting members to a position between the second pair of cutting members,
    the cutting surfaces of the third pair of cutting members being shaped and dimensioned to cut through both the outer sheath and the individual conductor insulation surrounding the electrical conductor without cutting the conductor when the conductor extends longitudinally from a position between the first pair of cutting members to a position between the second pair of cutting members.

3. A tool for stripping and cutting sheathed electrical cable according to claim 1 wherein the cutting members are removably mounted on the first and second arms.

4. A tool for stripping and cutting sheathed electrical cable, said cable including an outer sheath surrounding at least one electrical conductor covered with individual conductor insulation, said tool comprising:
    a first elongated member having a proximal end and a longitudinally opposite distal end and a length extending from the proximal end to the distal end;
    a second elongated member having a proximal end and a longitudinally opposite distal end and a length extending from the proximal end of the second elongated member to the distal end of the second elongated member, the second elongated member being joined to the first elongated member such that the first and second elongated members are pivotable about a pivot axis relative to each other;

a first pair of cutting members mounted an the first and second elongated members, one of the first pair of cutting members being mounted on one of the first and second elongated members, the other of the first pair of cutting members being mounted on the other of the first and second elongated members, each of the first pair of cutting members having a cutting surface oriented transverse to the length of the first elongated member and the length of the second elongated member, each cutting surface of the first pair of cutting members being presented toward the other cutting surface of the first pair of cutting members, the cutting surfaces of the first pair of cutting members moving toward one another upon pivotal movement of the first and second elongated members about the pivot axis relative to each other such that the proximal end of the first elongated member and the proximal end of the second elongated member move toward one another;

a second pair of cutting members mounted on the first and second elongated members, one of the second pair of cutting members being mounted on one of the first and second elongated members, the other of the second pair of cutting members being mounted on the other of the first and second elongated members, each of the second pair of cutting members having a cutting surface oriented transverse to the length of the first elongated member and the length of the second elongated member, each cutting surface of the second pair of cutting members being presented toward the other cutting surface of the second pair of cutting members, the cutting surfaces of the second pair of cutting members moving toward one another upon pivotal movement of the first and second elongated members about the pivot axis relative to each other such that the proximal end of the first elongated, member and the proximal end of the second elongated, member move toward one another; and a third pair of rutting members mounted on the first and second elongated members, one of the third pair of cutting members being mounted on one of the first and second elongated members, the other of the third pair of cutting members being mounted on the other of the first and second elongated members, each of the third pair of cutting members having a cutting surface oriented transverse to the length of the first elongated member and the length of the second elongated member, each cutting surface of the third pair of cutting members being presented toward the other cutting surface of the third pair of cutting members, the cutting surfaces of the third pair of cutting members moving toward one another upon pivotal movement of the first and second elongated members about the pivot axis relative to each other such that the proximal end of the first elongated member and the proximal end of the second elongated member move toward one another, the cutting surfaces of the first pair of cutting members being shaped and dimensioned to cut through the outer sheath of the sheathed electrical cable without cutting the individual conductor insulation covering the at least one electrical conductor and without cutting the at least one electrical conductor when the sheathed electrical cable extends longitudinally from a position between the first pair of cutting members to a position between the third pair of cutting members, the cutting surfaces of the second pair of cutting members being shaped and dimensioned to cut through the outer sheath of the sheathed electrical cable and through the individual conductor insulation covering the at least one electrical conductor without cutting the at least one electrical conductor when the sheathed electrical cable extends longitudinally from a position between the first pair of cutting members to a position between the third pair of cutting members, and the cutting surfaces of the third pair of cutting members being shaped and dimensioned to cut through (a) the outer sheath of the sheathed electrical cable, (h) the individual conductor insulation covering the at least one electrical conductor, and (c) the at least one electrical conductor when the sheathed electrical cable extends longitudinally from a position between the first pair of cutting members to a position between the third pair of cutting members.

5. A tool for stripping and cutting sheathed electrical cable according to claim 4 wherein the one of the first pair of cutting members is mounted on the first elongated member in a position adjacent the distal end of the first elongated member, the other of the first pair of cutting members being mounted on the second elongated member in a position adjacent the distal end of the second elongated member, the one of the third pair of cutting members being mounted on the first elongated member in a position between the proximal end of the first elongated member and the pivot axis, the other of the third pair of cutting members being mounted on the second elongated member in a position between the proximal end of the second elongated member and the pivot axis, the one of the second pair of cutting members being mounted on the first elongated member in a position between the third pair of cutting members and the pivot axis, the other of the second pair of cutting members being mounted on the second elongated member in a position between the third pair of cutting members and the pivot axis.

6. A tool for stripping and cutting sheathed electrical cable according to claim 4 wherein the cutting members of the second pair of cutting members are mounted on the first and second elongated members such that the cutting surfaces of the second pair of cutting members begin to cut through the outer sheath of the sheathed electrical cable before the cutting surfaces of the third pair of cutting members begin to cut through (a) the outer sheath of the sheathed electrical cable, (b) the individual conductor insulation covering the at least one electrical conductor, or (c) the at least one electrical conductor and before the cutting surfaces of the first pair of cutting members begin to cut through the outer sheath of the sheathed electrical cable when the sheathed electrical cable extends longitudinally from a position between the first pair of cutting members to a position between the third pair of cutting members.

7. A tool for stripping and cutting sheathed electrical cable according to claim 4 wherein the cutting members are removably mounted on the first and second arms.

8. A tool for stripping and cutting sheathed electrical cable according to claim 4 further comprising a stop to limit movement of the proximal end of the first elongated member toward the proximal end of the second elongated member, the stop limiting movement of the proximal end of the first elongated member toward the proximal end of the second elongated member such that such that the cutting surfaces of the first pair of cutting members are limited to cutting through the outer sheath of the sheathed electrical cable and are prevented from cutting the individual conductor insulation covering the at least one electrical conductor and from cutting the at least one electrical conductor and such that the cutting surfaces of the second pair of cutting members are limited to cutting through (a) the outer sheath of the sheathed electrical cable and (b) the individual conductor insulation covering the at least one electrical conductor and are prevented from cutting the at least one electrical conductor.

9. A tool for stripping and cutting a plurality of electrical conductors covered with individual conductor insulation, said tool comprising:
a first elongated member having a proximal end and a longitudinally opposite distal end and a length extending from the proximal end to the distal end;
a second elongated member having a proximal end and a longitudinally opposite distal end and a length extending from the proximal end of the second elongated member to the distal end of the second elongated member, the second elongated member being joined to the first elongated member such that the first and second elongated members are pivotable about a pivot axis relative to each other;
a pair of guide members mounted on the first and second elongated members, one of the pair of guide members being mounted on one of the first and second elongated members, the other of the pair of guide members being mounted on the other of the first and second elongated members, each of the pair of guide members having a guide surface oriented transverse to the length of the first elongated member and the length of the second elongated member, each guide surface of the pair of guide members being presented toward the other guide surface of the pair of guide members, the guide surfaces of the pair of guide members moving toward one another upon pivotal movement of the first and second elongated members about the pivot axis relative to each other such that the proximal end of the first elongated member and the proximal end of the second elongated member move toward one another;
a first pair of cutting members mounted on the first and second elongated members, one of the first pair of cutting members being mounted on one of the first and second elongated members, the other of the first pair of cutting members being mounted on the other of the first and second elongated members, each of the first pair of cutting members having a cutting surface oriented transverse to the length of the first elongated member and the length of the second elongated member, each cutting surface of the first pair of cutting members being presented toward the other cutting surface of the first pair of cutting members, the cutting surfaces of the first pair of cutting members moving toward one another upon pivotal movement of the first and second elongated members about the pivot axis relative to each other such that the proximal end of the first elongated member and the proximal end of the second elongated member move toward one another; and
a second pair of cutting members mounted on the first and second elongated members, one of the second pair of cutting members being mounted on one of the first and second elongated members, the other of the second pair of cutting members being mounted on the other of the first and second elongated members, each of the second pair of cutting members having a cutting surface oriented transverse to the length of the first elongated member and the length of the second elongated member, each cutting surface of the second pair of cutting members being presented toward the other cutting surface of the second pair of cutting members, the cutting surfaces of the second pair of cutting members moving toward one another upon pivotal movement of the first and second elongated members about the pivot axis relative to each other such that the proximal end of the first elongated member and the proximal end of the second elongated member move toward one another,
the cutting surfaces of the first pair of cutting members being shaped and dimensioned to cut through the individual conductor insulation covering each of the electrical conductors without cutting the electrical conductors when the electrical conductors extend longitudinally from a position between the pair of guide members to a position between the second pair of cutting members,
the cutting surfaces of the second pair of cutting members being shaped and dimensioned to cut through the individual conductor insulation covering each of the electrical conductors and through the plurality of electrical conductors when the electrical conductors extend longitudinally from a position between the pair of guide members to a position between the second pair of cutting members; and
the guide surfaces of the pair of guide members being shaped and dimensioned to guide the electrical conductors into a predetermined orientation relative to one another as the electrical conductors are extended lengthwise between the guide surfaces, the predetermined orientation being such that the cutting surfaces of the first pair of cutting members will cut through the individual conductor insulation covering each of the electrical conductors without cutting the electrical conductors.

* * * * *